(12) United States Patent
Miyashiro

(10) Patent No.: US 9,297,300 B2
(45) Date of Patent: Mar. 29, 2016

(54) STRADDLE-TYPE VEHICLE

(75) Inventor: Shidehiko Miyashiro, Iwata (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 1059 days.

(21) Appl. No.: 12/466,956

(22) Filed: May 15, 2009

(65) Prior Publication Data

US 2009/0266637 A1    Oct. 29, 2009

Related U.S. Application Data

(63) Continuation-in-part of application No. PCT/JP2007/072206, filed on Nov. 15, 2007.

(30) Foreign Application Priority Data

Nov. 15, 2006    (JP) ................................ 2006-308757

(51) Int. Cl.
| | |
|---|---|
| *B62K 11/04* | (2006.01) |
| *B62K 19/28* | (2006.01) |
| *F02B 61/02* | (2006.01) |
| *B62K 19/32* | (2006.01) |

(52) U.S. Cl.
CPC ............... *F02B 61/02* (2013.01); *B62K 11/04* (2013.01); *B62K 19/28* (2013.01); *B62K 19/32* (2013.01); *Y10T 74/13* (2015.01)

(58) Field of Classification Search
CPC ........ B62K 11/02; B62K 11/04; B62K 19/18; B62K 19/20; B62K 19/32
USPC .......... 180/219, 227, 228, 291, 297; 280/274, 280/281.1, 281, 1
See application file for complete search history.

(56) References Cited

U.S. PATENT DOCUMENTS

| 3,754,612 | A | * | 8/1973 | Watanabe et al. ............. 180/228 |
|---|---|---|---|---|
| 4,637,354 | A | | 1/1987 | Tominaga et al. |
| 4,798,254 | A | | 1/1989 | Lings |
| 4,945,866 | A | | 8/1990 | Chabot, Jr. |
| 5,109,943 | A | * | 5/1992 | Crenshaw et al. ............ 180/228 |
| 5,515,940 | A | | 5/1996 | Shichinohe et al. |
| 6,186,550 | B1 | * | 2/2001 | Horii et al. .................... 280/833 |
| 6,637,398 | B2 | | 10/2003 | Suzuki et al. |
| 6,679,347 | B2 | * | 1/2004 | Iimuro .......................... 180/219 |

(Continued)

FOREIGN PATENT DOCUMENTS

| JP | 02-031990 | 2/1990 |
|---|---|---|
| JP | 5-278661 | 10/1993 |

(Continued)

*Primary Examiner* — Anne Marie Boehler
(74) *Attorney, Agent, or Firm* — Rabin & Berdo, P.C.

(57) ABSTRACT

A vehicle body frame has a head pipe, a main frame, a down frame, and a lower frame. The main frame extends downward to the rear from the head pipe. The down frame extends downward to the rear from the head pipe in a position below the main frame. The lower frame connects an end of the down frame to an end of the main frame. An engine of the vehicle has a crankshaft, a crankcase, and a cylinder member. The crankshaft is housed in the crankcase. The cylinder member is attached to the crankcase. A cylinder is formed inside the cylinder member. An axis of the cylinder extends upward obliquely to the rear.

18 Claims, 25 Drawing Sheets

(56) References Cited

U.S. PATENT DOCUMENTS

| | | |
|---|---|---|
| 6,729,294 B2 | 5/2004 | Okano et al. |
| 7,188,695 B2 * | 3/2007 | Miyakawa et al. ........... 180/219 |
| 7,360,620 B2 * | 4/2008 | Takenaka et al. ............ 180/291 |
| 2001/0045312 A1 * | 11/2001 | Adachi et al. ................ 180/219 |
| 2002/0027032 A1 * | 3/2002 | Tsutsumikoshi ............. 180/219 |
| 2004/0206566 A1 * | 10/2004 | Katsura ........................ 180/219 |
| 2004/0255890 A1 | 12/2004 | Tsutsumi et al. |
| 2004/0255909 A1 | 12/2004 | Kurokawa et al. |
| 2006/0169511 A1 * | 8/2006 | Kurokawa et al. ........... 180/219 |
| 2007/0193805 A1 * | 8/2007 | Adachi et al. ................ 180/219 |

FOREIGN PATENT DOCUMENTS

| | | |
|---|---|---|
| JP | 2001-278158 | 10/2001 |
| JP | 2002-227601 | 8/2002 |
| JP | 2005-219616 | 8/2005 |
| JP | 2005-529030 | 9/2005 |
| JP | 2006-015837 | 1/2006 |
| JP | 2006-069407 | 3/2006 |
| JP | 2007-22098 | 2/2007 |
| JP | 2007-307944 | 11/2007 |
| WO | WO-03-057552 | 7/2003 |
| WO | WO 2005/005808 A1 | 1/2005 |

* cited by examiner

STRADDLE-TYPE VEHICLE

CROSS-REFERENCE TO RELATED APPLICATIONS

This application is a continuation-in-part of International Application No. PCT/JP2007/072206, filed Nov. 15, 2007 and designating the U.S., and claims the benefit of the earlier filing date thereof under 35 U.S.C. §365. International Application No. PCT/JP2007/072206 is hereby incorporated herein in its entirety by reference.

BACKGROUND OF THE INVENTION

1. Field of the Invention

The present invention relates to a straddle-type vehicle.

2. Technical Background

There is a possibility that a relatively heavy load is applied to a vehicle body in a straddle-type vehicle, such as an off-road vehicle capable of driving on an irregular terrain. Therefore, relatively high rigidity for the vehicle is demanded.

As a method for improving the rigidity of the vehicle, use of a body frame with relatively high rigidity has been considered. For example, a so-called cradle-type body frame disclosed in JP-A-2001-278158 can be implemented as a body frame with relatively high rigidity. More specifically, the cradle-type frame generally includes a head pipe, a main frame, a down frame, a lower frame, and a seat rail. The main frame extends downward to the rear from the head pipe. The down frame extends downward to the rear from the head pipe in a position below the main frame. An end of the main frame and an end of the down frame are connected to each other through the lower frame. Accordingly, a loop-shaped space in a plan view is formed with the main frame, the down frame, and the lower frame. An engine is mounted in this loop-shaped space in a plan view in the straddle-type vehicle employing the cradle-type body frame.

As described above, frames are placed above and below the engine in the cradle-type body frame. Therefore, it is commonly known that relatively high rigidity can easily be obtained with the cradle-type body frame. However, depending on a type of a straddle-type vehicle and intended use thereof, there is a need for further improvement in the rigidity of the body frame.

For example, metal members constituting the body frame can be thickened in order to further improve the rigidity of the body frame. However, thickening of the metal members constituting the body frame tends to cause an increase in the body frame weight. Thus, when it is attempted to improve the rigidity of the vehicle merely by improving the rigidity of the body frame, the vehicle weight tends to be increased.

SUMMARY OF THE INVENTION

The present invention has been made in view of the foregoing points, and therefore, an object of the invention is to improve rigidity of a straddle-type vehicle while suppressing an increase in vehicle weight.

A straddle-type vehicle according to the present invention includes a body frame, a steering shaft, front forks, a front wheel, and an engine. The body frame has a head pipe, a main frame, a down frame, and a lower frame. The main frame extends downward to the rear of the straddle-type vehicle from the head pipe. The down frame extends downward to the rear from the head pipe in a position below the main frame. The lower frame connects an end of the down frame to an end of the main frame. The steering shaft is rotatably inserted in the head pipe. The front forks are attached to the steering shaft. The front wheel is rotatably attached to the front forks. The engine has a crankshaft, a crankcase, and a cylinder member. The crankshaft is housed in the crankcase. The cylinder member is attached to the crankcase. A cylinder is formed inside the cylinder member. An axis of the cylinder extends upward obliquely to the rear.

The engine is fixed to the main frame with the cylinder member. The engine is fixed to the lower frame with the crankcase.

According to the invention, it is possible to improve rigidity of a straddle-type vehicle while suppressing an increase in vehicle weight.

DETAILED DESCRIPTION OF THE INVENTION

Figure 1:
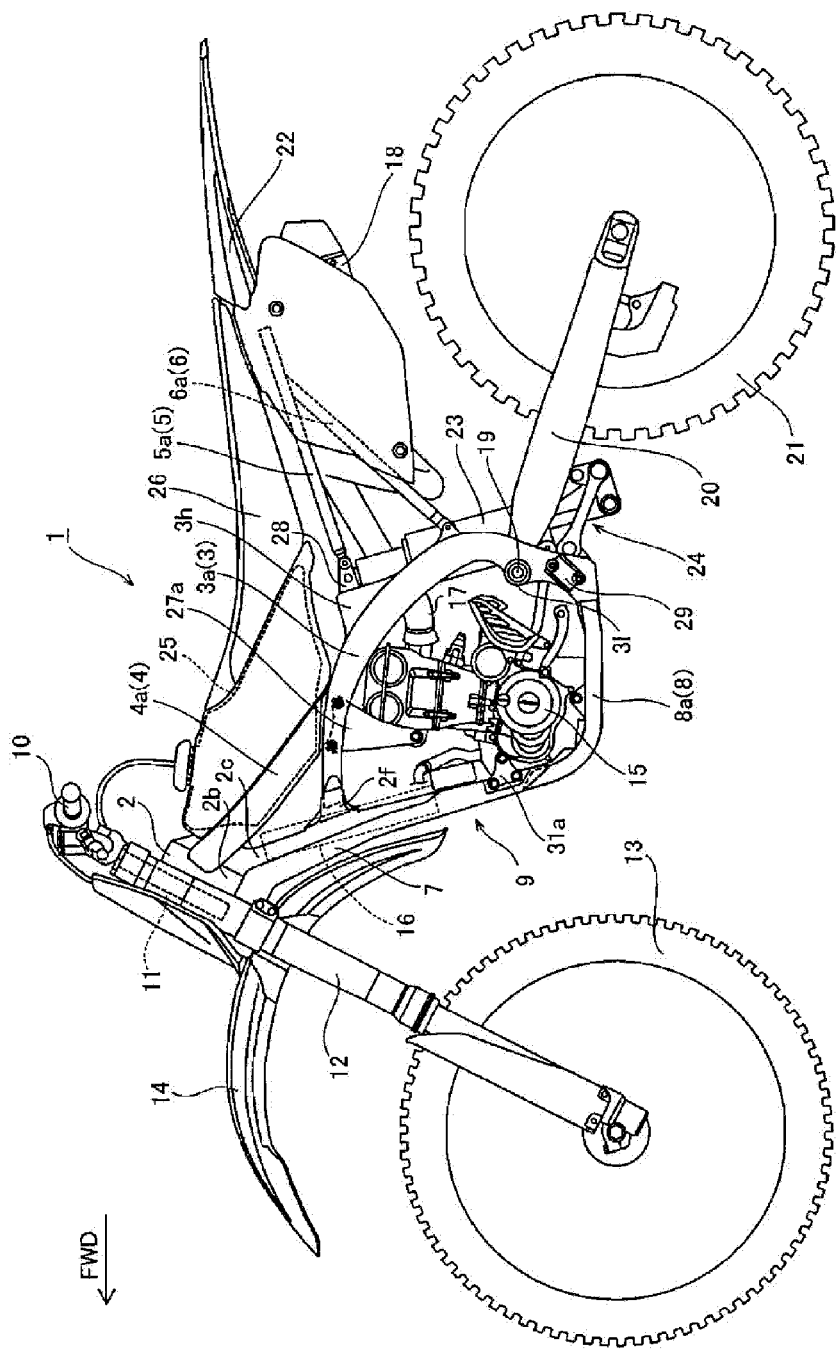
FIG. 1 is a side view showing an overall configuration of a motorcycle according to an embodiment of the invention.

An example of the preferred embodiment of the invention will hereinafter be described with reference to a motorcycle 1 as shown in FIG. 1. However, a straddle-type vehicle according to the invention is not limited to the so-called off-road type motorcycle 1 shown in FIG. 1. The "straddle-type vehicle" according to the invention means a vehicle on which a rider straddles a seat. Therefore, the straddle-type vehicle according to the invention may be an All Terrain Vehicle (ATV) or the like. The straddle-type vehicle according to the invention may also be a vehicle other than an off-road vehicle. More specifically, the straddle-type vehicle according to the present invention may be a motorcycle or the like. That is, the meaning of "motorcycle" as used herein includes a motorcycle proper, an off-road vehicle, and the like. In addition, the meaning of "motorcycle" as used herein includes a vehicle that has a plurality of wheels at least either in the front or in the rear thereof and that changes a traveling direction by tilting a vehicle body.

Forward, rear, left, and right directions in the following descriptions denote directions as viewed from a rider seated on a seat 26.

General Construction of Motorcycle 1

Figure 2:
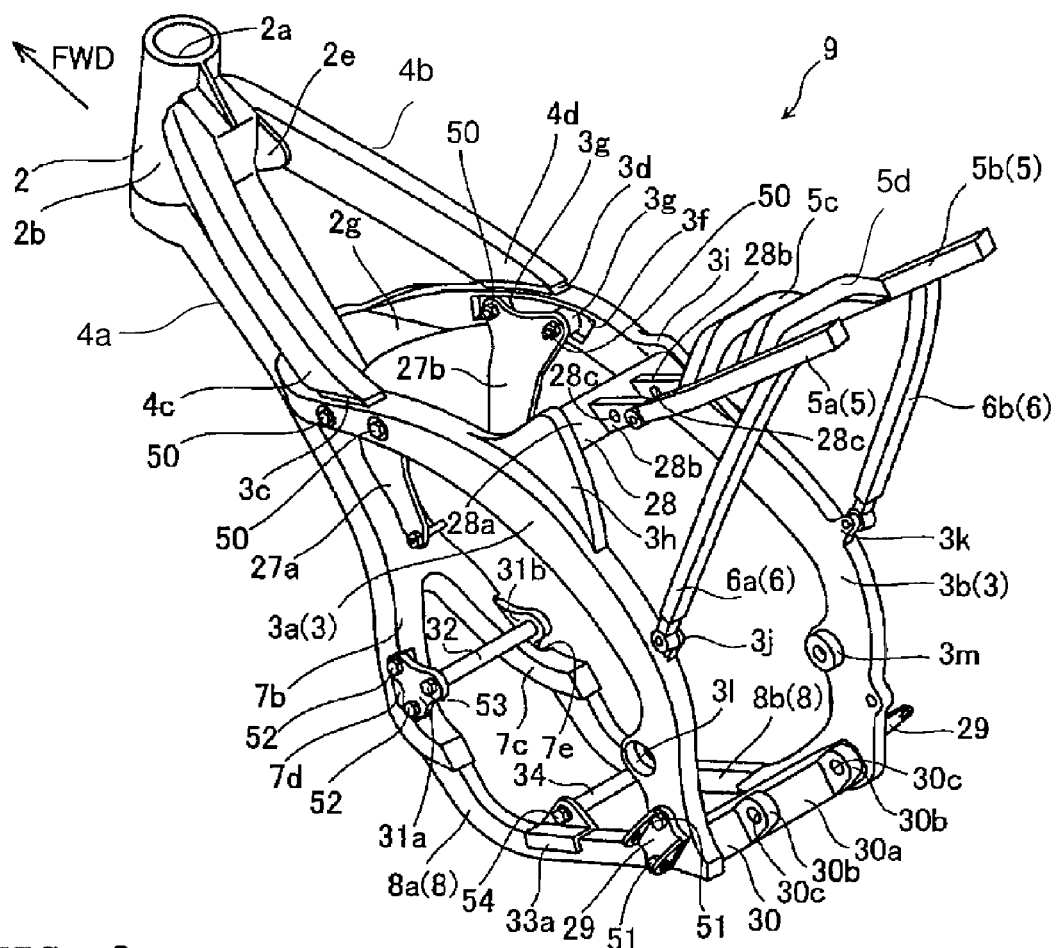
FIG. 2 is a perspective view showing a body frame of the motorcycle according to the embodiment.
Figure 3:
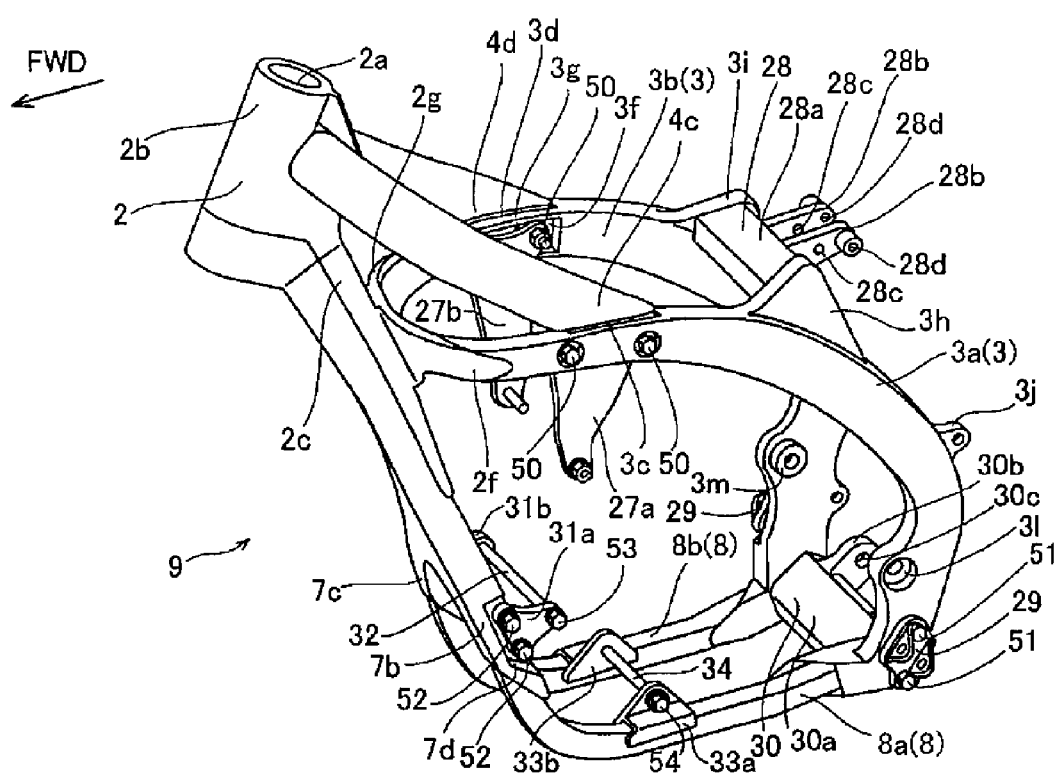
FIG. 3 is a perspective view showing a main frame and its surroundings, in the motorcycle according to the embodiment.

As shown in FIGS. 1 to 3, the motorcycle 1 has a body frame 9. The body frame 9 includes a head pipe 2, a main frame 3, a tank rail 4, a seat rail 5, a backstay 6, a down frame 7, and a lower frame 8.

The head pipe 2 is disposed at the front end of the body frame 9. The main frame 3 is connected to the head pipe 2. The main frame 3 extends slightly downward to the rear from the head pipe 2. The main frame 3 is bent in the middle and extends approximately downward therefrom.

The tank rail 4 is disposed between the head pipe 2 and the mainframe 3. A front end of the tank rail 4 is connected to the head pipe 2, and a rear end of the tank rail 4 is connected to the main frame 3. A resinous fuel tank 25 is disposed above the tank rail 4. The fuel tank 25 is disposed in such a way that it is held between a left tank rail 4a and a right tank rail 4b (see FIG. 2), which together constitute the tank rail 4. The seat 26 is disposed behind the fuel tank 25.

The seat rail 5 is connected to the middle of the main frame 3. The seat rail 5 extends slightly upward to the rear from the main frame 3. A rear end of the seat rail 5 is connected to a rear end of the main frame 3 through the backstay 6.

The down frame 7 is connected to the head pipe 2. The down frame 7 extends downward to the rear from the head pipe 2 in a position below the main frame 3. A rear end of the down frame 7 and the rear end of the main frame 3 are connected through the lower frame 8.

As shown in FIG. 1, a steering shaft 11 is rotatably inserted in the head pipe 2. Handlebars 10 are attached to an upper end of the steering shaft 11. A pair of front forks 12 extending obliquely downward to the front is attached to the steering shaft 11. A front wheel 13 is rotatably attached to lower ends of the paired front forks 12. A front fender 14 is disposed above the front wheel 13. The front wheel 13 is covered by this front fender 14 from above.

A pivot shaft 19 is attached to the rear end of the main frame 3. A rear arm 20 is swingably attached to the pivot shaft 19. A rear wheel 21 is rotatably attached to a rear end of the rear arm 20. The rear arm 20 is connected to an end of a rear suspension 23 via a coupling member 24. The other end of the rear suspension 23 is connected to the main frame 3. Shocks from the vertical swings of the rear arm 20 are absorbed by this rear suspension 23.

A rear fender 22 is disposed above the rear wheel 21. The rear wheel 21 is covered by this rear fender 22 from above.

As shown in FIG. 1, an engine 15 is mounted in an area surrounded by the main frame 3, the down frame 7, and the lower frame 8 in a side view. A radiator 16 is disposed in front of and above the engine 15. The radiator 16 is arranged to extend downward slightly to the rear. The engine 15 is cooled down by a function of the radiator 16. An exhaust pipe 17 is connected to a rear portion of the engine 15. The exhaust pipe 17 extends rearward from the engine 15. The exhaust pipe 17 is connected to a muffler 18.

Detailed Construction of Body Frame 9

In the embodiment under discussion, the head pipe 2 is made of aluminum. The head pipe 2 is formed by semi-solid die casting. Semi-solid die casting is a method of forming a metal member by die casting metal that is a mixture of a liquid and solid phase. The utilization of semi-solid die casting can improve the strength of moldings, as compared to the utilization of a conventional casting method.

Figure 6:
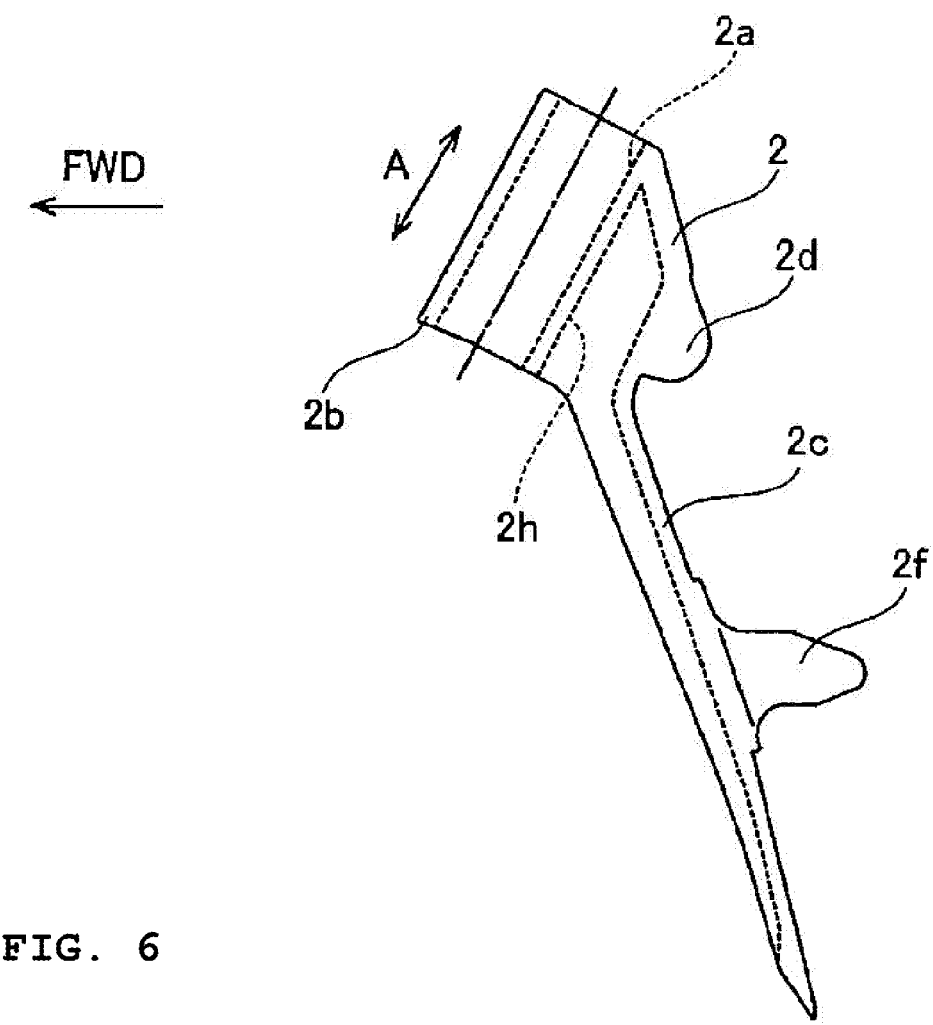
FIG. 6 is a side view showing a head pipe structure of the motorcycle according to the embodiment.

As shown in FIG. 6, the head pipe 2 includes a cylindrical section 2b and a body section 2c. An insertion hole 2a is formed in the cylindrical section 2b. The insertion hole 2a extends in a predetermined direction A. The body section 2c is located at the rear of the cylindrical section 2b. The body section 2c extends in a downward direction.

Figure 4:
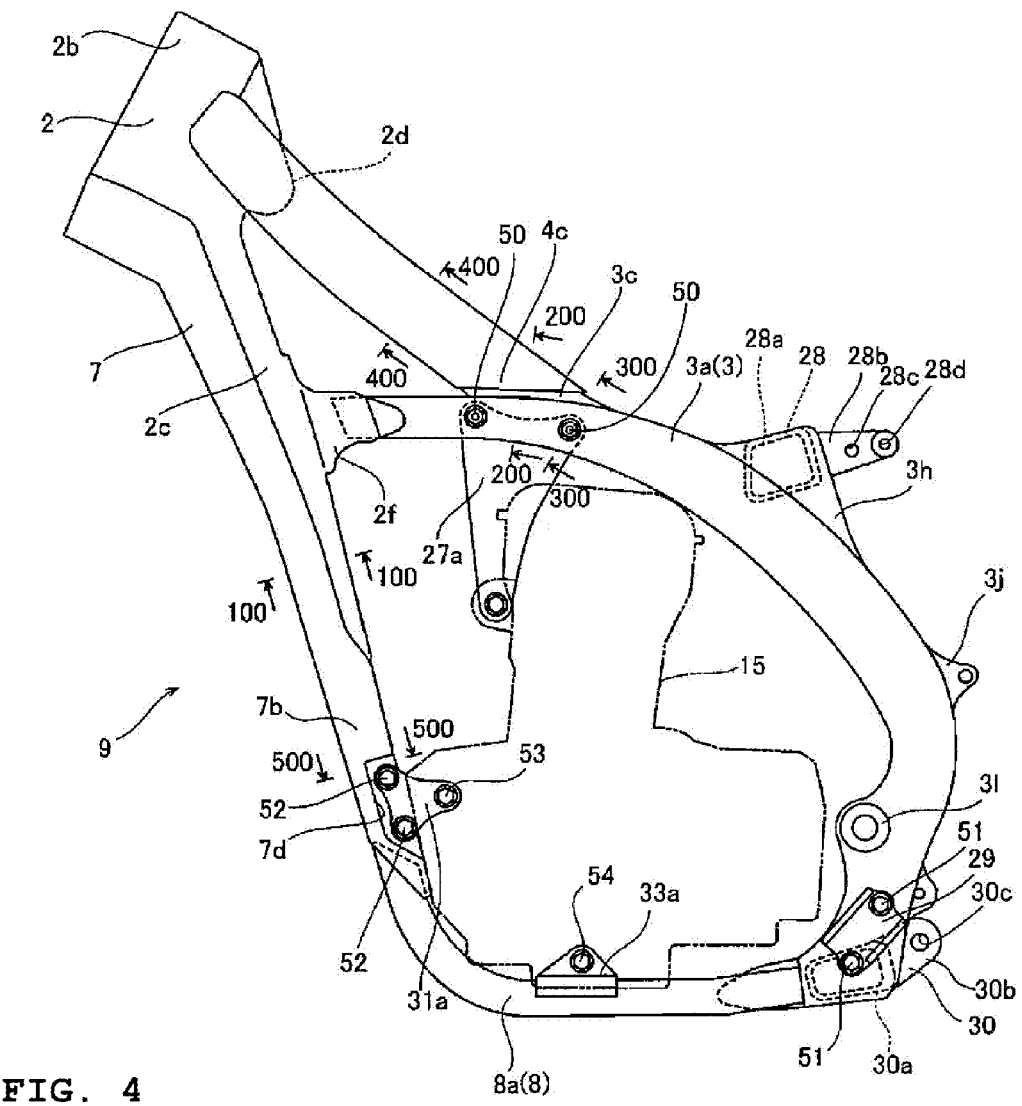
FIG. 4 is a side view showing the main frame and its surroundings, in the motorcycle according to the embodiment.
Figure 5:
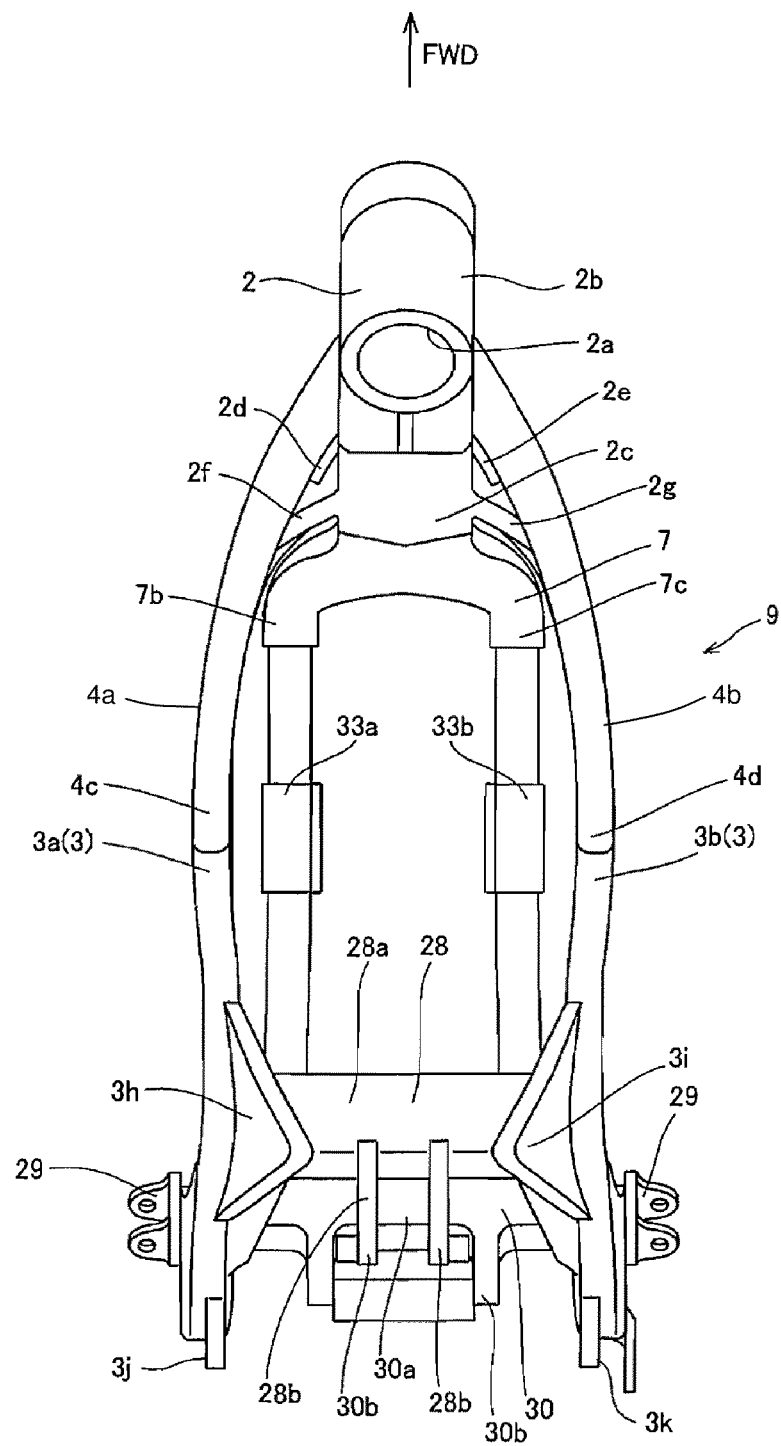
FIG. 5 is a plan view showing the main frame and its surroundings, in the motorcycle according to the embodiment.

A weld reinforcement 2d shown in FIGS. 4-6, and a weld reinforcement 2e shown in FIG. 2 and FIG. 5 are formed in portions of the body section 2c of the head pipe 2 at the rear of the cylindrical section 2b. The weld reinforcement 2d is formed to project from the left side of the head pipe 2 to the rear. The weld reinforcement 2e is formed to project from the right side of the head pipe 2 to the rear.

A weld part 2f shown in FIGS. 4-6, and a weld part 2g shown in FIG. 2, FIG. 3 and FIG. 5 are formed as frame parts in portions of the head pipe 2 below the weld reinforcements 2d, 2e.

In the embodiment under discussion, the weld reinforcements 2d, 2e, the weld parts 2f, 2g, and the head pipe 2 are integrally formed by semi-solid die casting.

Figure 7:
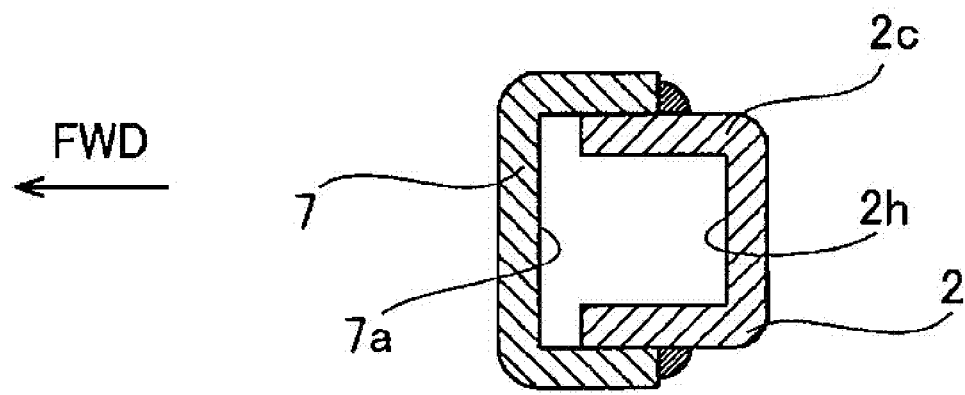
FIG. 7 is a sectional view taken along the cutout line 100-100 in FIG. 4.
Figure 8:
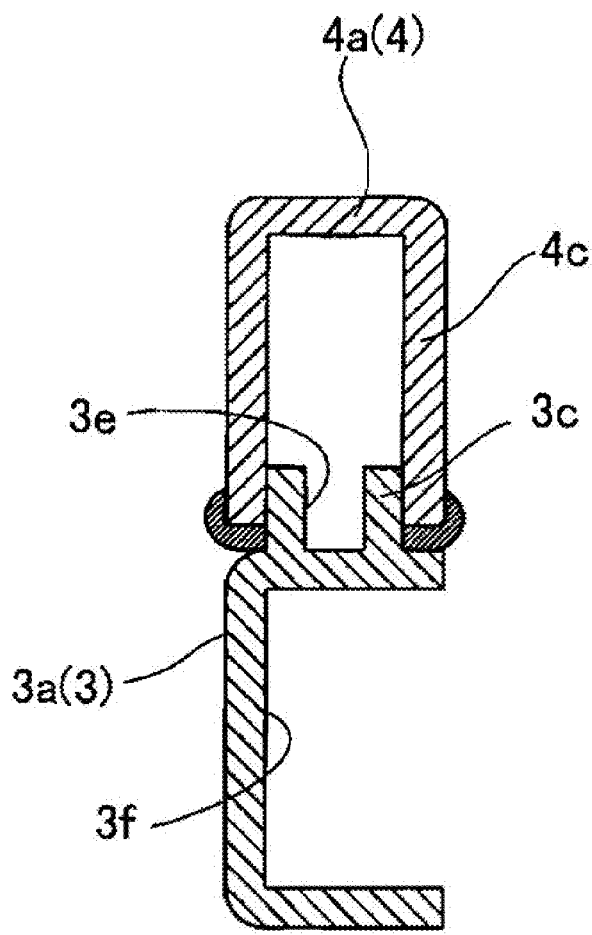
FIG. 8 is a sectional view taken along the cutout line 200-200 in FIG. 4.

As shown in FIG. 6, a recess 2h is formed in a front portion of the body section 2c. The recess 2h opens in the direction A that the insertion hole 2a extends. Therefore, as shown in FIG. 7, the body section 2c is formed to have a U-shaped cross section.

Like the head pipe 2, the main frame 3 is made of aluminum. Further, like the head pipe 2, the main frame 3 is formed by semi-solid die casting. As shown in FIGS. 2 and 3, the main frame 3 includes a left frame 3a located on the left side and a right frame 3b located on the right side.

As shown in FIGS. 2 and 5, the left frame 3a and the right frame 3b of the main frame 3 are arranged to extend rearward and to have predetermined spacing therebetween in a vehicle width direction in a plan view. Front ends of the left frame 3a and the right frame 3b are respectively welded to the weld parts 2f, 2g in the body section 2c of the head pipe 2. Therefore, the left frame 3a and the right frame 3b are formed in a U-shape in cross section, in such a way that they approach each other toward the body section 2c of the head pipe 2.

As shown in FIGS. 2 and 4, connections 3c, 3d are respectively formed on top of the left frame 3a and the right frame 3b. The tank rail 4 is welded to the connections 3c, 3d. The connections 3c, 3d shown in FIG. 2 are arranged to be fitted to a connection 4c and a connection 4d of the tank rail 4, respectively. The connections 3c, 3d are respectively welded to the connection 4c and the connection 4d. The connections 3c, 3d each have a recess 3e on an inner side of a portion thereof that is fitted to the connections 4c, 4d of the tank rail 4.

Figure 9:
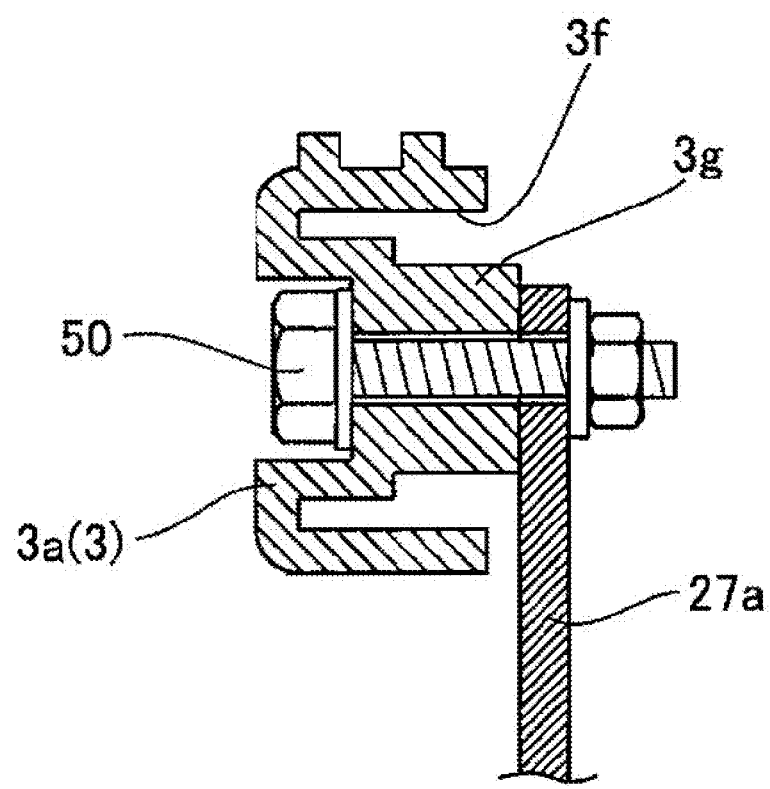
FIG. 9 is a sectional view taken along the cutout line 300-300 in FIG. 4.

As shown in FIGS. 2 and 9, portions of the left frame 3a and the right frame 3b near the portions thereof to which the tank rail 4 is welded each include a U-shaped cross section forming a recess 3f. A boss 3g is integrally formed on the inside of each recess 3f. As shown in FIG. 4, a left support plate 27a for supporting the engine 15 is provided. As shown in FIG. 2, the left support plate 27a and a right support plate 27b for supporting the engine 15 are fixed to the bosses 3g. The bosses 3g and the support plate 27a as well as the bosses 3g and the support plate 27b are fixed by screws 50.

In the embodiment under discussion, since the main frame 3 is formed by semi-solid die casting, it is possible to integrally form the recesses 3e and the bosses 3g with the main frame 3.

As shown in FIG. 2, bracket weld parts 3h, 3i are integrally formed in the middle of the left frame 3a and of the right frame 3b, respectively, in a longitudinal direction. As shown in FIG. 5, the bracket weld parts 3h, 3i are formed to extend upward to the inside of the body frame 9. Also, as shown in FIGS. 2 and 3, a rear suspension bracket 28 is welded to the bracket weld parts 3h, 3i. An upper section of the rear suspension 23 shown in FIG. 1 is supported by the rear suspension bracket 28.

The rear suspension bracket 28 includes a cross pipe 28a and two attachments 28b. The cross pipe 28a is formed by extrusion. The two attachments 28b are integrally formed with the cross pipe 28a. A rear-suspension support hole 28c and a seat-rail support hole 28d are formed in each of the attachments 28b.

As shown in FIG. 2, attachments 3j, 3k are respectively formed at a portion of the left frame 3a at the rear of the bracket weld part 3h and at a portion of the right frame 3b at the rear of the bracket weld part 3i. The backstay 6 is attached to the attachments 3j, 3k.

Fixing parts 3l, 3m are respectively formed in lower portions of the left frame 3a and the right frame 3b as shown in FIG. 1 and FIG. 2. The pivot shaft 19 is fixed to the fixing parts 3l, 3m.

Still referring to FIGS. 1 and 2, footrest holding plates 29 are respectively fixed with a screw 51 to a portion, lower than the fixing part 3l, of the left frame 3a, and to a portion, lower than the fixing part 3m, of the right frame 3b. A footrest, not shown, is held by the footrest holding plate 29.

As shown in FIG. 2, a coupling member bracket 30 is welded to the left frame 3a and the right frame 3b at their lower ends. The coupling members 24 (see FIG. 1) are attached to the coupling member bracket 30. The coupling member bracket 30 includes a cross pipe 30a and two attachments 30b. The cross pipe 30a is formed by extrusion. The two attachments 30b are integrally formed with the cross pipe 30a. A coupling-member support hole 30c is formed in each attachment 30b.

As shown in FIGS. 3, 4 and 5, the left frame 3a and the right frame 3b are formed to curve inward, toward, e.g., the down frame 7, so that their lower ends are more forwardly disposed than middle portions thereof.

Figure 10:
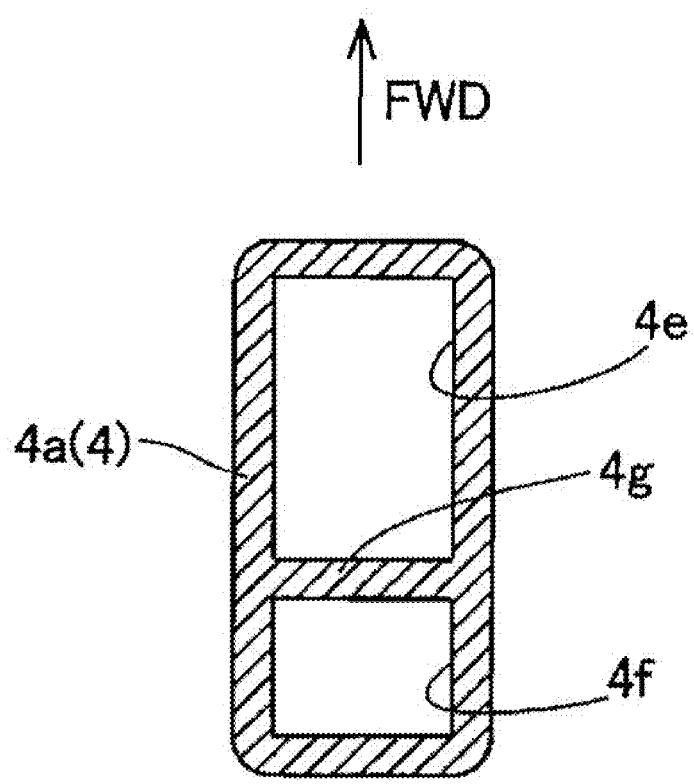
FIG. 10 is a sectional view taken along the cutout line 400-400 in FIG. 4.

The tank rail 4 is made of aluminum and formed by extrusion. Referring to FIG. 2, the tank rail 4 includes the left tank rail 4a located on the left side and the right tank rail 4b located on the right side. As shown in FIG. 10, the tank rail 4 is formed to be hollow. The tank rail 4 includes a wall 4g. An internal space of the tank rail 4 is divided into a hole 4e and a hole 4f by the wall 4g. At least one of the hole 4e and the hole 4f may communicate with an outside of the tank rail 4.

As shown in FIG. 2 and FIG. 5, the front end of the left tank rail 4a is welded to the upper left of the body section 2c of the head pipe 2 and the weld reinforcement 2d. The connection 4c at the rear end of the left tank rail 4a is welded to the connection 3c of the left frame 3a. The front end of the right tank rail 4b is welded to the upper right of the body section 2c of the head pipe 2 and the weld reinforcement 2e. The connection 4d at the rear end of the right tank rail 4b is welded to the connection 3d of the right frame 3b.

The seat rail 5 includes a left rail 5a located on the left side, a right rail 5b located on the right side, and two reinforcing pipes 5c, 5d. The left rail 5a and the right rail 5b are connected by the two reinforcing pipes 5c, 5d. Front ends of the left rail 5a and the right rail 5b are fixed in the seat-rail support holes 28d in the attachments 28b of the rear suspension bracket 28 (see also FIG. 3).

As shown in FIG. 2, the backstay 6 includes a left stay 6a located on the left side and a right stay 6b located on the right side. Upper ends of the left stay 6a and the right stay 6b are welded to the left rail 5a and the right rail 5b, respectively. Lower ends of the left stay 6a and the right stay 6b are attached to the attachment 3j on the left frame 3a and the attachment 3k on the right frame 3b, respectively.

The down frame 7 is made of aluminum, by forging. As shown in FIG. 4, a rear surface of the down frame 7 is welded to the head pipe 2. As shown in FIG. 7, a recess 7a is formed in a part of the down frame 7 to which the head pipe 2 is welded. The part of the down frame 7 to which the head pipe 2 is welded has a U-shaped cross section.

Figure 11:
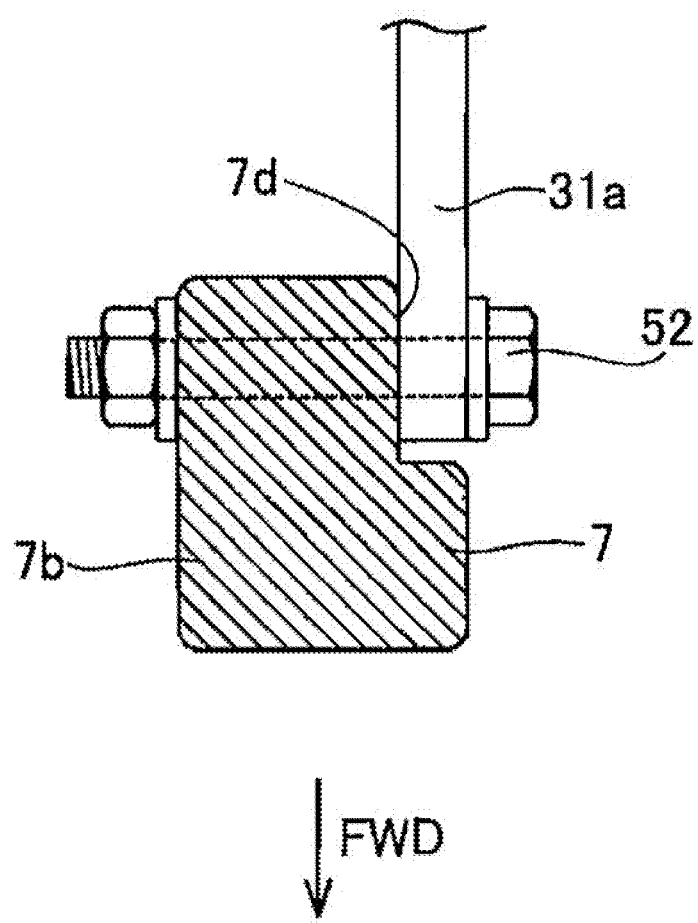
FIG. 11 is a sectional view taken along the cutout line 500-500 in FIG. 4.

As shown in FIG. 2, a lower part of the down frame 7 is bifurcated into a left frame 7b extending downward to the left and a right frame 7c extending downward to the right. Recesses 7d, 7e are respectively formed in the left frame 7b and the right frame 7c. As shown in FIGS. 2 and 11, support plates 31a, 31b are respectively fixed to the recesses 7d, 7e by screws 52. As shown in FIGS. 2 and 4, a support bar 32 for supporting the engine 15 is fixed to the support plates 31a, 31b with screws 53.

The lower frame 8 is made of aluminum and formed by extrusion. As shown in FIG. 2, the lower frame 8 includes a left lower frame 8a located on the left side and a right lower frame 8b located on the right side. Front ends of the left lower frame 8a and the right lower frame 8b are welded to lower ends of the left frame 7b and the right frame 7c, respectively. As shown in FIG. 3, support plates 33a, 33b are respectively welded to upper surfaces of the left lower frame 8a and the right lower frame 8b. A support bar 34 for supporting the engine 15 is fixed to the support plates 33a, 33b with screws 54. Rear ends of the left lower frame 8a and the right lower frame 8b are welded to front portions of lower ends of the left frame 3a and the right frame 3b, respectively.

Structure of Engine 15

Next, the structure of the engine unit 15 will be described with reference to FIGS. 18 to 20. In the embodiment under discussion, the engine 15 is a water-cooled single-cylinder engine. However, the invention is not limited to this structure. The engine 15 may be an in-line multi-cylinder engine. In addition, the engine 15 may be an air-cooled engine. The in-line multi-cylinder engine can be an in-line two cylinder engine.

Figure 18:
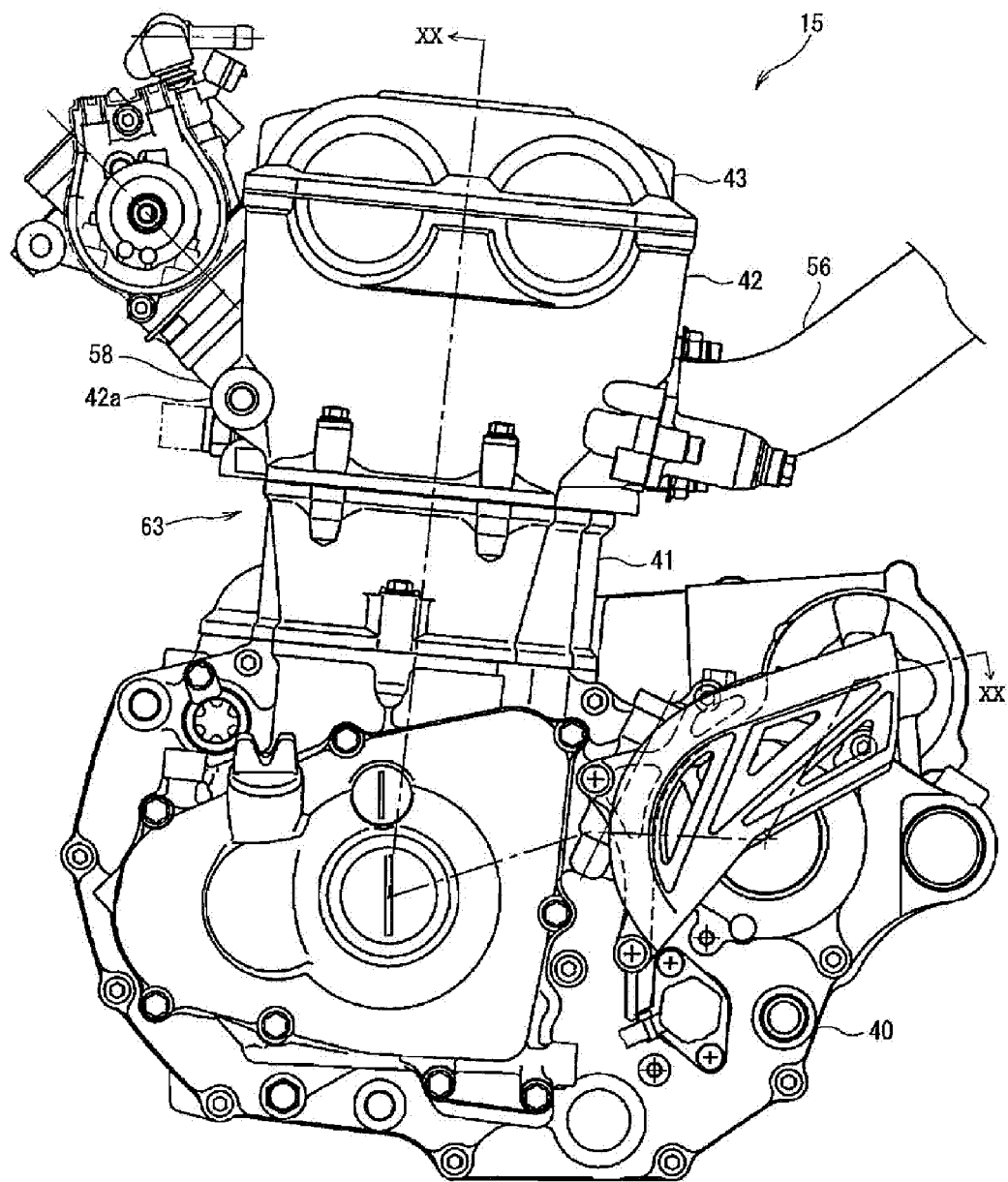
FIG. 18 is an enlarged left side view of the engine according to the embodiment.
Figure 19:
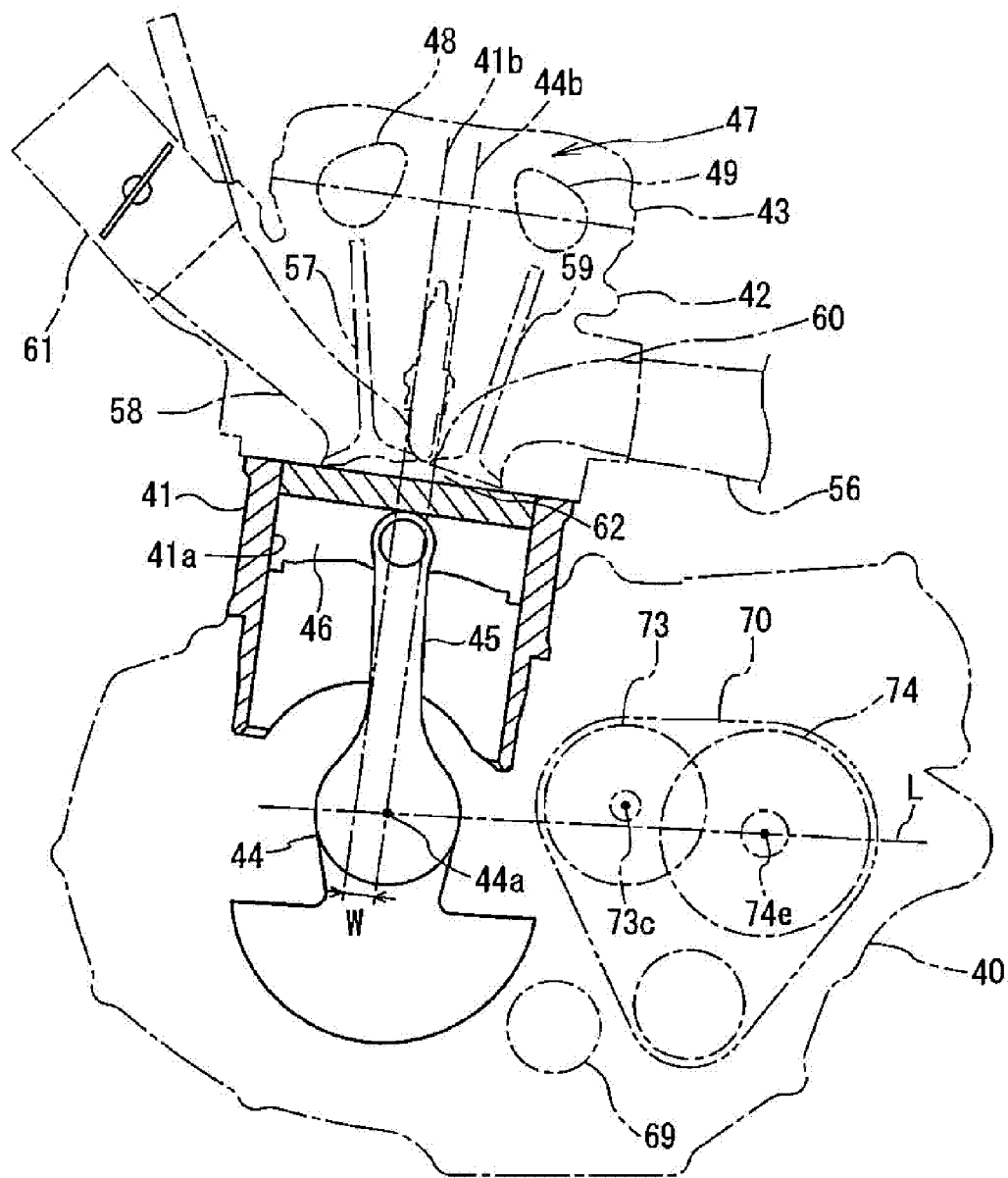
FIG. 19 is a sectional side view, partly in phantom, for describing a configuration of the engine according to the embodiment.

As shown in FIGS. 18 and 19, the engine 15 includes a crankcase 40, a cylinder member 63, a head cover 43, a change gear mechanism 70, and an oil pump 69. The cylinder member 63 includes a cylinder body 41 and a cylinder head 42.

Figure 20:
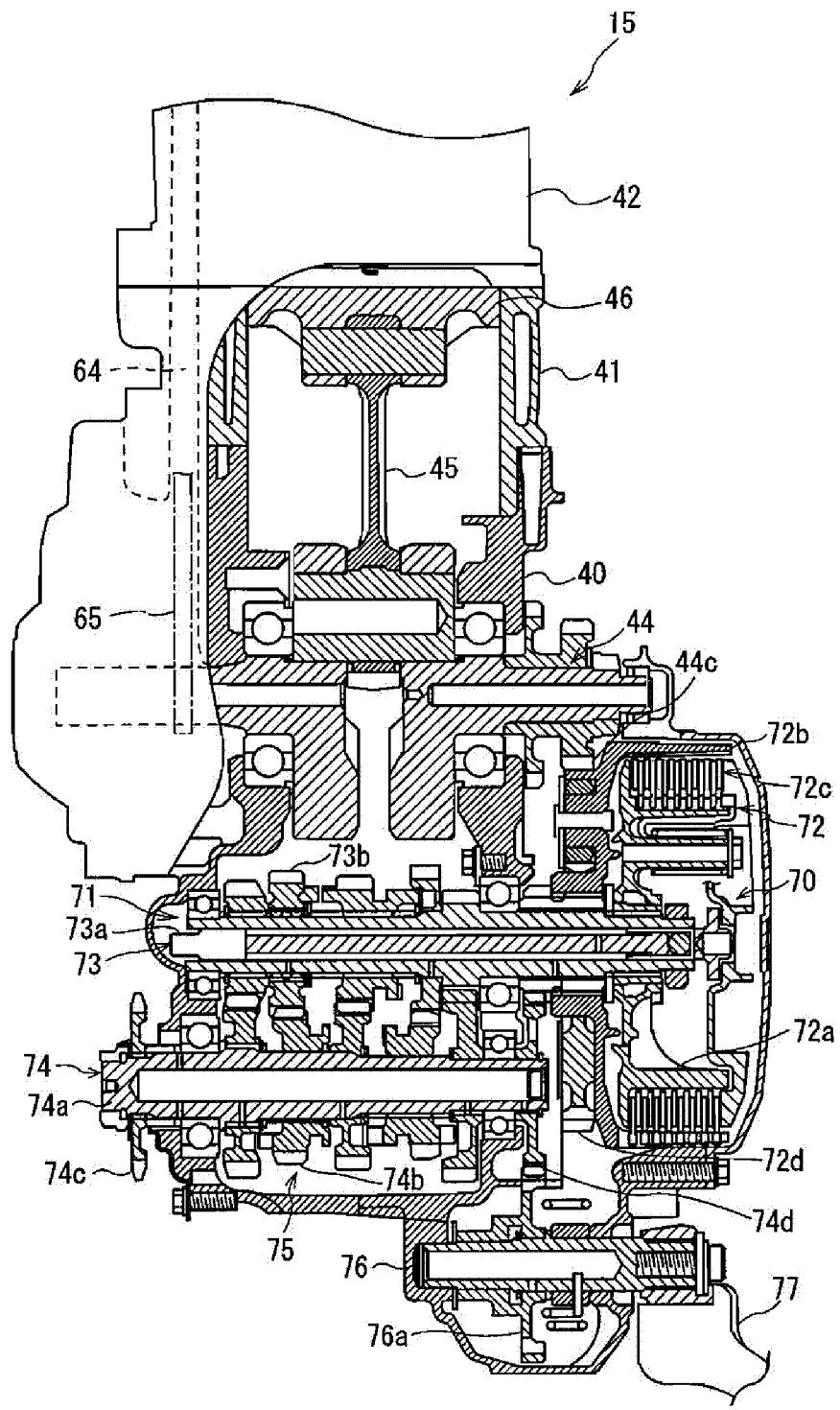
FIG. 20 is a partial sectional view taken along the cutout line XX-XX in FIG. 18.

As shown in FIGS. 19 and 20, a crankshaft 44 extending in a vehicle width direction is housed in the crankcase 40. As shown in FIG. 20, a connecting rod 45 is attached to the crankshaft 44. A piston 46 is attached to an end of the connecting rod 45.

As shown in FIG. 19, a cylinder 41a in a generally cylindrical shape is formed in the cylinder body 41. The piston 46 is housed in this cylinder 41a. The cylinder body 41 is attached to a front half of the crankcase 40. More specifically, as shown in FIG. 19, the cylinder body 41 is attached to the crankcase 40 in such a way that a lower portion of the cylinder body 41 is located inside the crankcase 40. Therefore, the cylinder 41a extends into the crankcase 40.

In more detail, the cylinder body 41 is attached to the crankcase 40 in such a way that the cylinder 41a inclines rearward to the side of the gear change mechanism 70, which will be described later. More specifically, an axis 41b of the cylinder 41a extends upward obliquely to the rear from the crankshaft 44 side. In the view of FIG. 19, the axis 41b of the cylinder 41a passes in front of an axis 44a of the crankshaft 44 when viewed from a direction in which the crankshaft 44 extends. In other words, in the view of FIG. 19, the axis 41b of the cylinder 41a is to be understood as being located in front of (e.g., closer to a viewer than) a straight line 44b that intersects the axis 44a of the crankshaft 44 and is parallel to the axis 41b. A direction in which the crankshaft 44 extends is the same as the vehicle width direction. To dispose a cylinder as described in the foregoing is referred to herein as "to offset the cylinder."

The cylinder head 42 is attached to an end of the cylinder body 41. A valve mechanism 47 is housed in the cylinder head 42. The valve mechanism 47 includes an intake valve 57, an exhaust valve 59, an intake camshaft 48, and an exhaust camshaft 49. As shown in FIG. 20, a cam chain chamber 64 is formed in the cylinder head 42 and the cylinder body 41. The cam chain chamber 64 may be disposed laterally in a vehicle width direction with respect to the cylinder 41a. A cam chain 65 is housed in the cam chain chamber 64. The rotation of the crankshaft 44 is transmitted to the intake camshaft 48 and the exhaust camshaft 49 by the cam chain 65. This drives the intake valve 57 and the exhaust valve 59. As a result, the intake valve 57 and the exhaust valve 59 open and close.

Referring to FIG. 19, a throttle body 61 is attached to the cylinder head 42 so as to be connected to the intake port 58. Air and fuel are supplied to a combustion chamber 62 from this throttle body 61 via the intake port 58. An exhaust pipe 56 is connected to the exhaust port 60. Exhaust gas in the combustion chamber 62 is discharged to the outside through the exhaust port 60 and the exhaust pipe 56.

Referring to FIG. 20, the gear change mechanism 70 is housed in the crankcase 40. The gear change mechanism 70 includes a transmission 71 and a multiplate clutch 72. The transmission 71 includes a main shaft 73 having an axis 73c as an input shaft and a drive shaft 74 having an axis 74e as an output shaft.

The clutch 72 is attached to a right end of the main shaft 73. The clutch 72 includes an inner element 72a, an outer element 72b, and a plate group 72c. The plate group 72c includes a plurality of clutch plates and a plurality of friction plates. The clutch plates and the friction plates are arranged so as to alternate. Either the plural clutch plates or the plural friction plates are provided in such a way that they are unable to rotate with respect to the inner element 72a. The other plates are unable to rotate with respect to the outer element 72b.

The plate group 72c is located between the inner element 72a and the outer element 72b. The plural plates constituting the plate group 72c are brought into contact with each other by pressurizing for rotation transmission between the inner element 72a and the outer element 72b. The outer element 72b is rotatable with respect to the main shaft 73. A gear 72d is fixed to the outer element 72b. The gear 72d meshes with a gear 44c provided on the crankshaft 44. Therefore, the outer element 72b rotates along with the rotation of the crankshaft 44. On the other hand, the inner element 72a is attached to the main shaft 73 in such a way that it is unable to rotate with respect to the main shaft 73. Therefore, once the clutch 72 is engaged, the inner element 72a and the main shaft 73 rotate together with the outer element 72b.

The main shaft 73 includes a main shaft body 73a and a first shift gear group 73b. The drive shaft 74 includes a drive shaft body 74a and a second shift gear group 74b. The first shift gear group 73b and the second shift gear group 74b mesh with each other. A shift gear pair 75 is composed of the first shift gear group 73b and the second shift gear group 74b. The rotation of the main shaft 73 is transmitted to the drive shaft 74 by the shift gear pair 75 in various change gear ratios.

A sprocket 74c is provided on the left end of the drive shaft 74. A drive chain, not shown, is wound around the sprocket 74c and acts as a power transmission means to the rear wheel 21. Accordingly, the rotation of the drive shaft 74 is transmitted to the rear wheel 21.

A gear 74d is formed at the right end of the drive shaft 74. The gear 74d meshes with a one-way gear 76a provided on a kick shaft 76. Also, a kick pedal 77 is attached to the kick shaft 76. Therefore, when the kick pedal 77 is operated by the rider, the rotation of the kick shaft 76 is transmitted to the crankshaft 44 via the drive shaft 74, the main shaft 73, and the clutch 72.

Configuration of Body Frame 9

Figure 12:
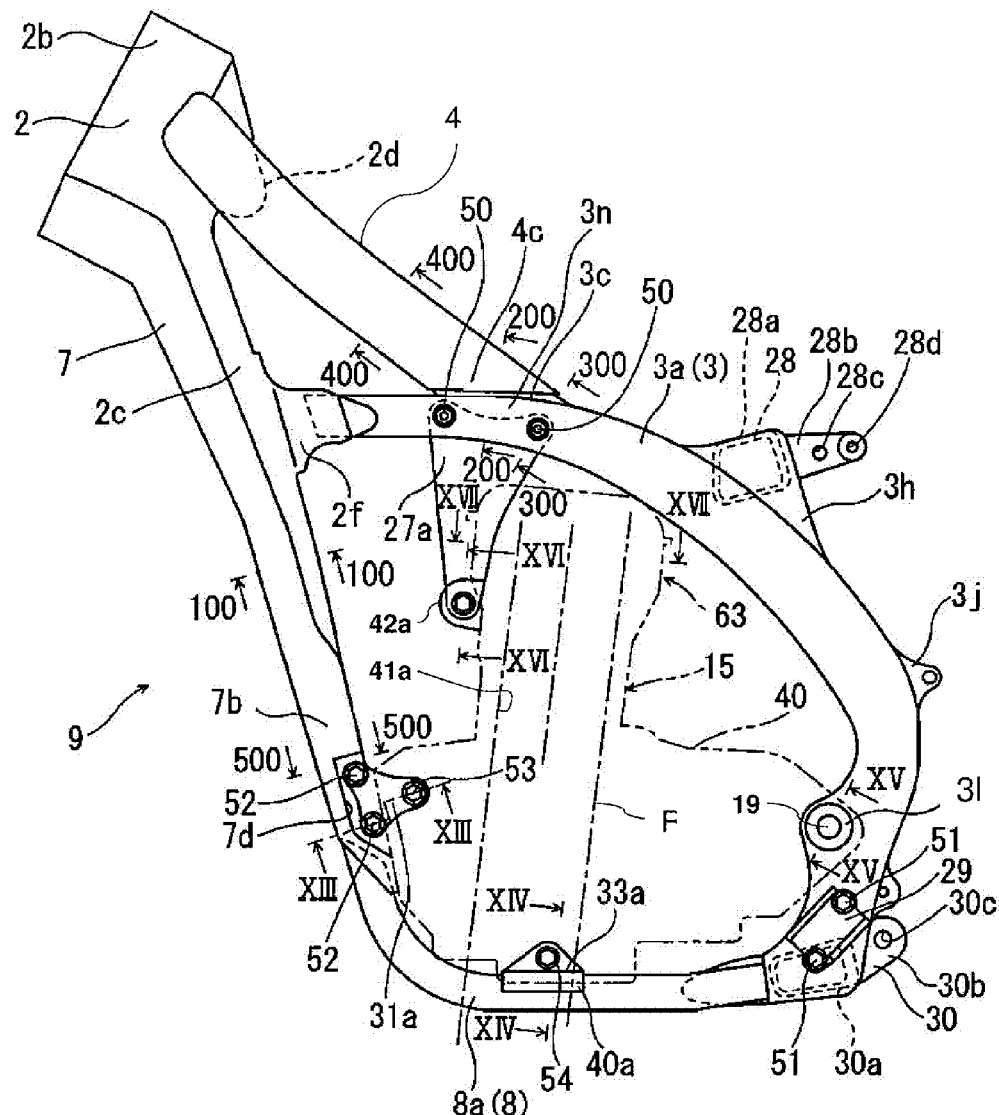
FIG. 12 is a side view for describing a mounting structure of an engine according to the embodiment.
Figure 13:
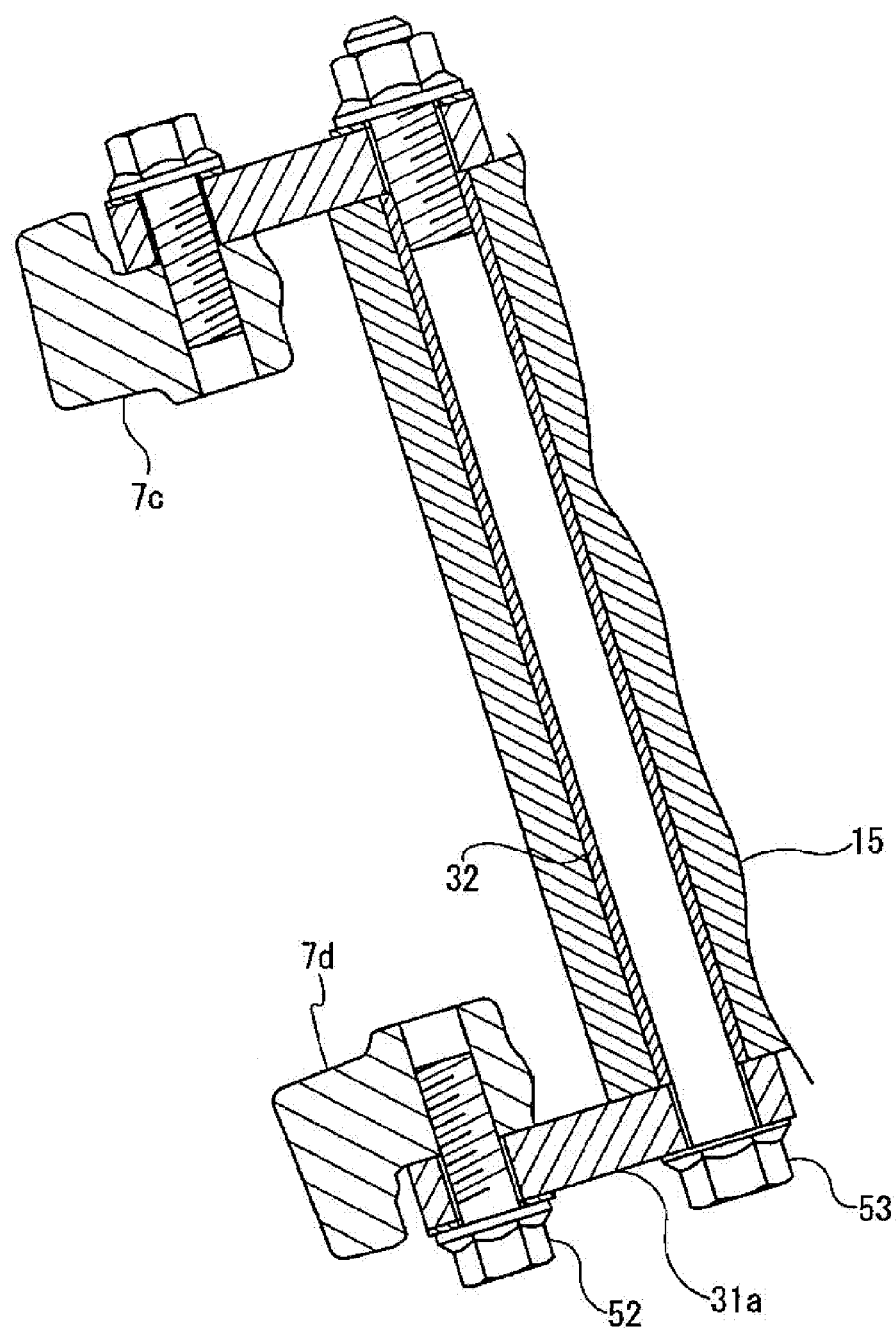
FIG. 13 is a sectional view taken along the cutout line XIII-XIII in FIG. 12.

The configuration of the body frame 9 is described in more detail mainly with reference to FIG. 12. The body frame 9 includes the head pipe 2, the main frame 3, the down frame 7, and the lower frame 8.

The main frame 3 is connected to the head pipe 2, and extends downward to the rear from the head pipe 2. In more detail, the main frame 3 extends downward above and along the down frame 7 from the head pipe 2 to the middle of the main frame 3. The main frame 3 is bifurcated in the middle (see, e.g., FIGS. 2, 3 and 5). Respective branches of the bifurcated main frame 3 bend rearward. More specifically, each branch of the bifurcated main frame 3 extends downward to the rear above the down frame 7, and bends downward at a middle portion of the branch. Thus, each branch of the bifurcated main frame 3 forms an arc shape in a side view.

The down frame 7 is disposed below the main frame 3. The down frame 7 extends downward to the rear from the head pipe 2. The down frame 7 is formed in a generally linear shape from the head pipe 2 in a side view.

An end of the down frame 7 and an end of the main frame 3 are connected through the lower frame 8. Thus, the body frame 9, formed by the main frame 3, the down frame 7, and the lower frame 8, is loop-shaped in a side view.

The tank rail 4 is disposed above the main frame 3. The middle of the main frame 3 and the head pipe 2 are connected to each other through the tank rail 4. In more detail, an arch-shaped portion of the main frame 3 and the head pipe 2 are connected through the tank rail 4.

In the embodiment under discussion, an example wherein the main frame 3, the down frame 7, the lower frame 8, and the tank rail 4 are formed individually is described. However, at least two of the main frame 3, the down frame 7, the lower frame 8, and the tank rail 4 may be formed integrally. Also, the manner of connection between the plural frame members is not limited. The plural frame members may be connected by welding, for example, or the plural frame members may be connected by screws or the like.

Frame parts are named for convenience of description; therefore, it should be understood that the name of each frame part is not limiting. For instance, the tank rail 4 may constitute a portion of the main frame 3. Also, a down frame may be composed of the down frame 7 and the lower frame 8, in the embodiment under discussion. An end of the down frame and an end of the main frame may directly be connected to each other.

In view of the foregoing, the language "body frame having a head pipe, a main frame extending downward to the rear from the head pipe, a down frame extending downward to the rear in a position below the main frame, and a lower frame connecting an end of the down frame with an end of the main frame" is intended to describe all body frames having loop-shaped portions that surround a space for mounting an engine.

Mounting Structure of Engine 15

Next, a mounting structure of the engine 15 is described in detail with reference to FIGS. 12 to 16, 9, and 11.

As shown in FIG. 12, the engine 15 is substantially mounted in a space surrounded by the main frame 3, the down frame 7, and the lower frame 8. The engine 15 is fixed to the main frame 3 with the cylinder member 63. More specifically, the engine 15 is fixed to the main frame 3 with the cylinder head 42.

Figure 16:
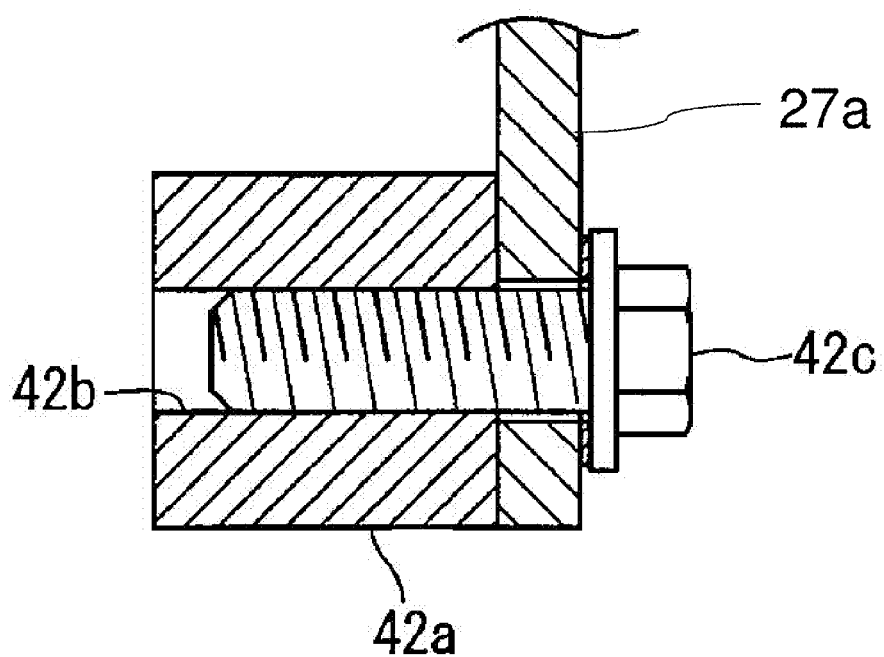
FIG. 16 is a sectional view taken along the cutout line XVI-XVI in FIG. 12.
Figure 17:
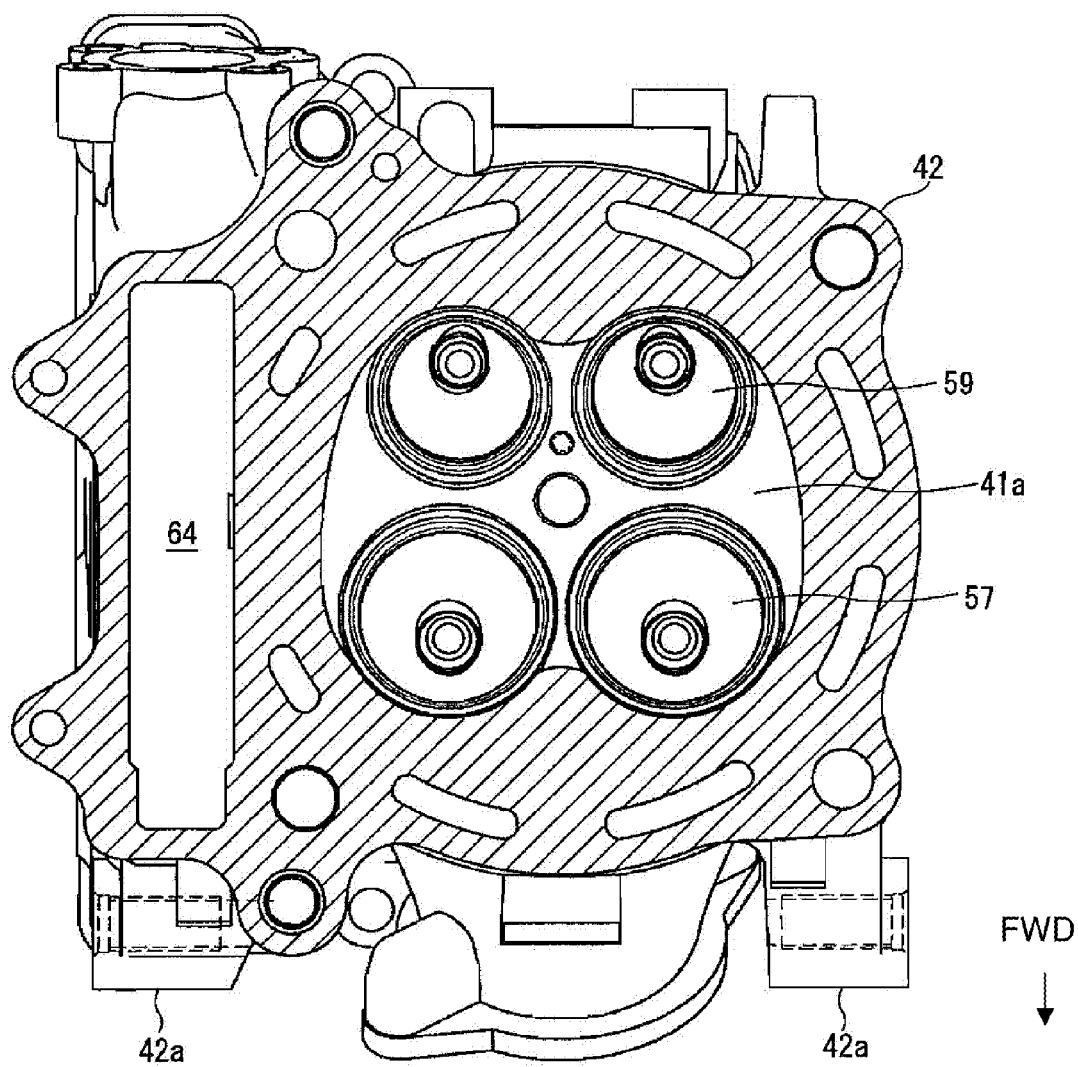
FIG. 17 is a sectional view taken along the cutout line XVII-XVII in FIG. 12.

As shown in FIGS. 12 and 17, a left and a right pair of attachments 42a is formed in the cylinder head 42. As shown in FIG. 16, a hole 42b is formed in the attachment 42a. A screw hole is formed in an inner periphery of the hole 42b. As shown in FIG. 16, the attachment 42a and a lower end of the support plate 27a are fixed by a screw 42c that is fixed to the hole 42b.

The support plate 27a is formed in a generally triangular shape in a plan view. The support plate 27a acts as a second support plate. Support plate 33a, which acts as a first support plate, is discussed in more detail further on. An upper end of the support plate 27a is fixed to the main frame 3 by the screw 50 as shown in FIG. 9. In more detail, referring to FIG. 12, the upper end of the support plate 27a is fixed to a connection 3n of the main frame 3 to the tank rail 4.

Referring to FIG. 17, the attachments 42a are provided in a front portion of the cylinder head 42. More specifically, each of the attachments 42a is provided in such a way that at least a portion of the attachment 42a is positioned in front of the cylinder 41a. In the embodiment under discussion, the attachments 42a are provided in such a way that the entire attachments 42a are positioned in front of the cylinder 41a. In addition, as shown in FIG. 17, each of the attachments 42a is provided in such a way that at least a portion of the attachment 42a is positioned in front of the cam chain chamber 64. In the embodiment under discussion, the attachments 42a are provided in such a way that the entire attachments 42a are positioned in front of the cam chain chamber 64.

As shown in FIGS. 18 and 19, the attachments 42a are also provided below the throttle body 61. Throttle body 61 constitutes a portion of an intake pipe.

As shown in FIG. 12, at least a portion of the support plate 27a is located in an area R corresponding to an extension of the cylinder 41a in a side view. As illustrated in FIG. 19, the cylinder 41a has an innermost radius so as to form an aperture in the cylinder 41a to house the piston 46. As illustrated, outermost edges of the extension are both disposed a distance, that is equal to said radius, away from said axis 41b of the cylinder 41a, and parallel to the axis 41b of the cylinder 41a.

Figure 14:
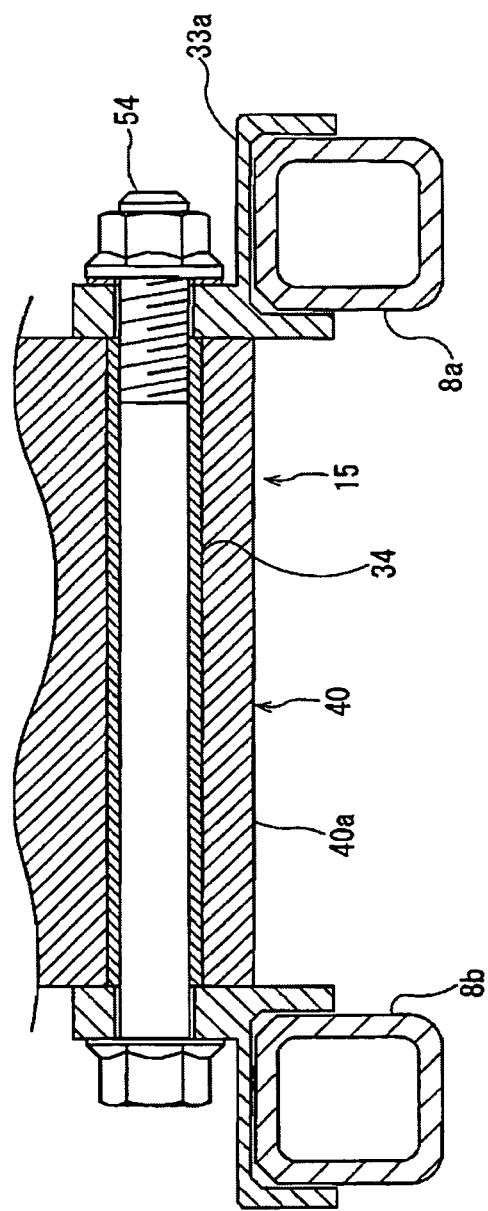
FIG. 14 is a sectional view taken along the cutout line XIV-XIV in FIG. 12.

As further shown in FIG. 12, the engine 15 is fixed to the lower frame 8 with the crankcase 40. In more detail, the support plate 33a, acting as a first support plate, is welded to the lower frame 8. An attachment 40a is formed in the crankcase 40 as shown in FIG. 14. The attachment 40a and the support plate 33a are fixed to each other by the screw 54.

As still further shown in FIG. 12, at least a portion of the support plate 33a is disposed in the area R.

As described above, the top and the bottom of the engine 15 are supported by the body frame 9 in the embodiment under discussion. In addition, the front and the rear of the engine 15 are also supported by the body frame 9 as shown in FIG. 12. That is, the engine 15 is supported by the body frame 9 at four points: front, rear, left, and right.

Figure 15:
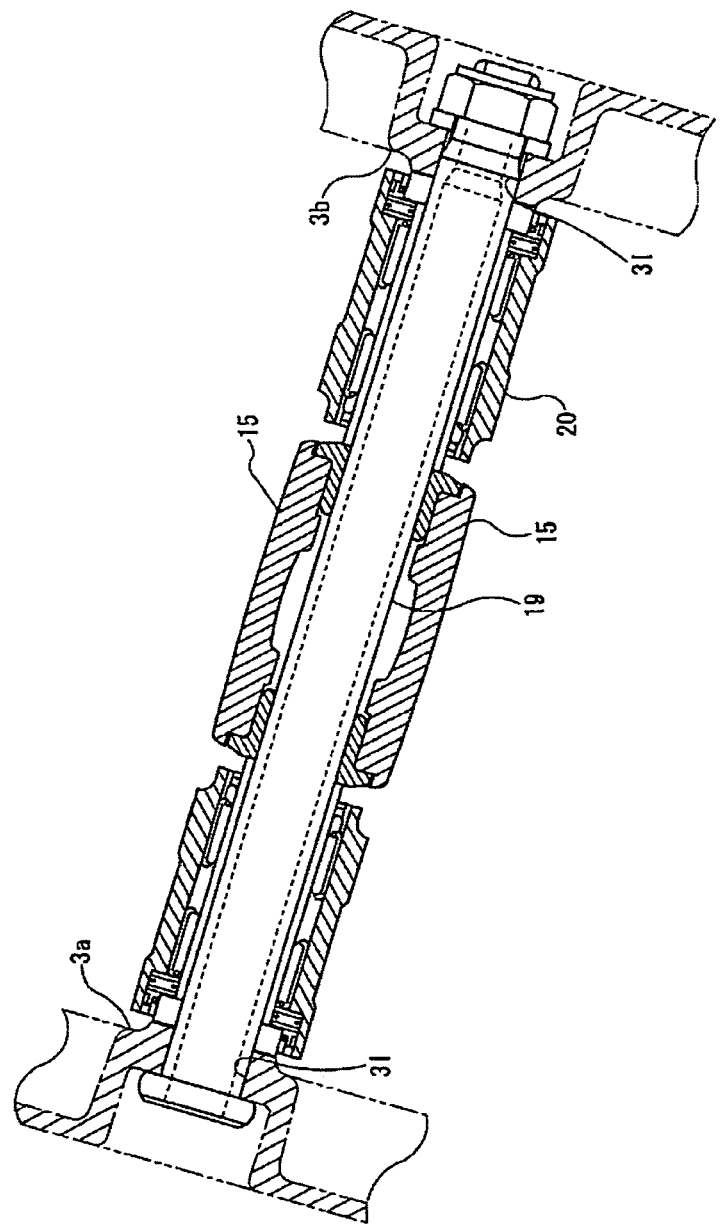
FIG. 15 is a sectional view taken along the cutout line XV-XV in FIG. 12.

More specifically, as shown in FIGS. 2, 4, 12, and 13, a front end of the crankcase 40 is fixed to the down frame 7 by the support plate 31a. As shown in FIGS. 12 and 15, a rear end of the crankcase 40 is fixed to the rear end of the main frame 3 by the pivot shaft 19. In FIG. 4, a rear portion of the engine 15 is omitted. Therefore, a connection between the rear end of the crankcase 40 and the rear end of the main frame 3 is not shown in FIG. 4.

Function and Effect

The inventors focused not on improvement of the rigidity of the body frame 9 itself but on improvement of the overall rigidity of the engine 15 and the body frame 9 by utilizing the engine 15 as a support rigid body. From this perspective, it was found that, in the motorcycle disclosed in JP-A-2001-278158, the engine 15 did not function effectively as a support rigid body. As a result, the inventors discovered the structure in the embodiment described above.

In other words, in the embodiment described above, the cylinder 41a is inclined rearward. The engine 15 is fixed to the main frame 3 with the cylinder member 63 and is fixed to the lower frame 8 with the crankcase 40. Therefore, the engine 15 can be effectively utilized as a support rigid body. Accordingly, it is possible to improve the rigidity of the motorcycle 1 as a whole. Also, the rigidity required for the body frame 9 decreases. Therefore, weight of the body frame 9 and hence that of the motorcycle 1 can be reduced.

Effects of this embodiment will hereinafter be described in more detail with reference to FIGS. 21 and 22.

Figure 21:
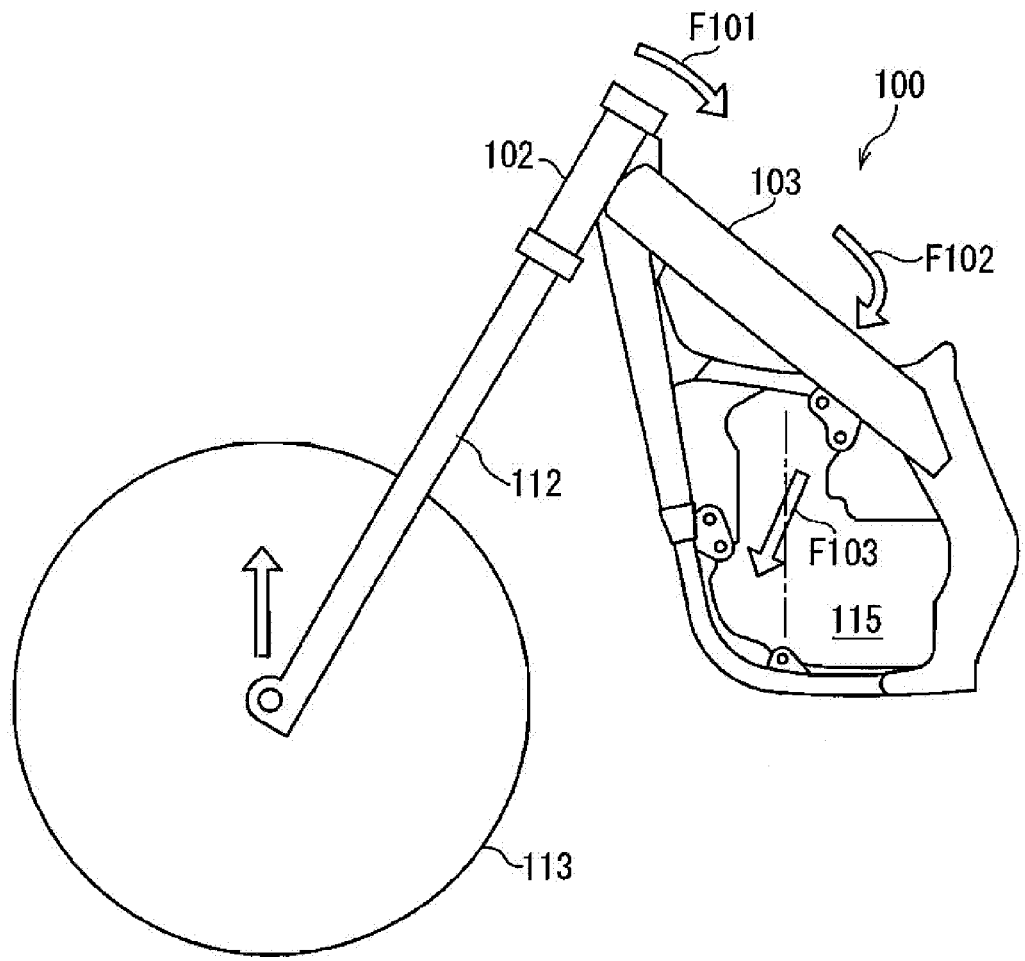
FIG. 21 is a schematic side view for describing stress acting on a conventional motorcycle.

FIG. 21 is a schematic side view for describing stress applied to a motorcycle 100 disclosed in JP-A-2001-2781. For example, when a front wheel 113 hits an obstacle such as a stone, upward stress is applied to the front wheel 113. The front wheel 113 is connected to a head pipe 102 via a front fork 112 and a steering shaft. Here, the front fork 112 and the head pipe 102 extend upward and to the rear. Therefore, downward force F101 to the rear is applied to the head pipe 102. Consequently, obliquely downward force F102 to the front is applied to a main frame 103. Accordingly, obliquely downward force F103 to the front is applied to an engine 115.

As described above, while the obliquely downward force F103 to the front is applied to the engine 115, a cylinder in the engine 115 extends obliquely and slightly upward to the front. Therefore, a direction of the force F103 varies to a relatively great degree from a direction in which the cylinder in the engine 115 extends. In general, the engine 115 is most rigid against force parallel to the direction in which the cylinder extends. Therefore, when the engine 115 in inclined forward as shown in FIG. 21, it is difficult to effectively use the engine 115 as a support rigid body. It is thus necessary to improve the rigidity of the body frame 9 itself in order to improve the rigidity of the motorcycle 100. Accordingly, the weight of the motorcycle 100 tends to increase when it is attempted to improve the rigidity of the motorcycle 100.

Figure 22:
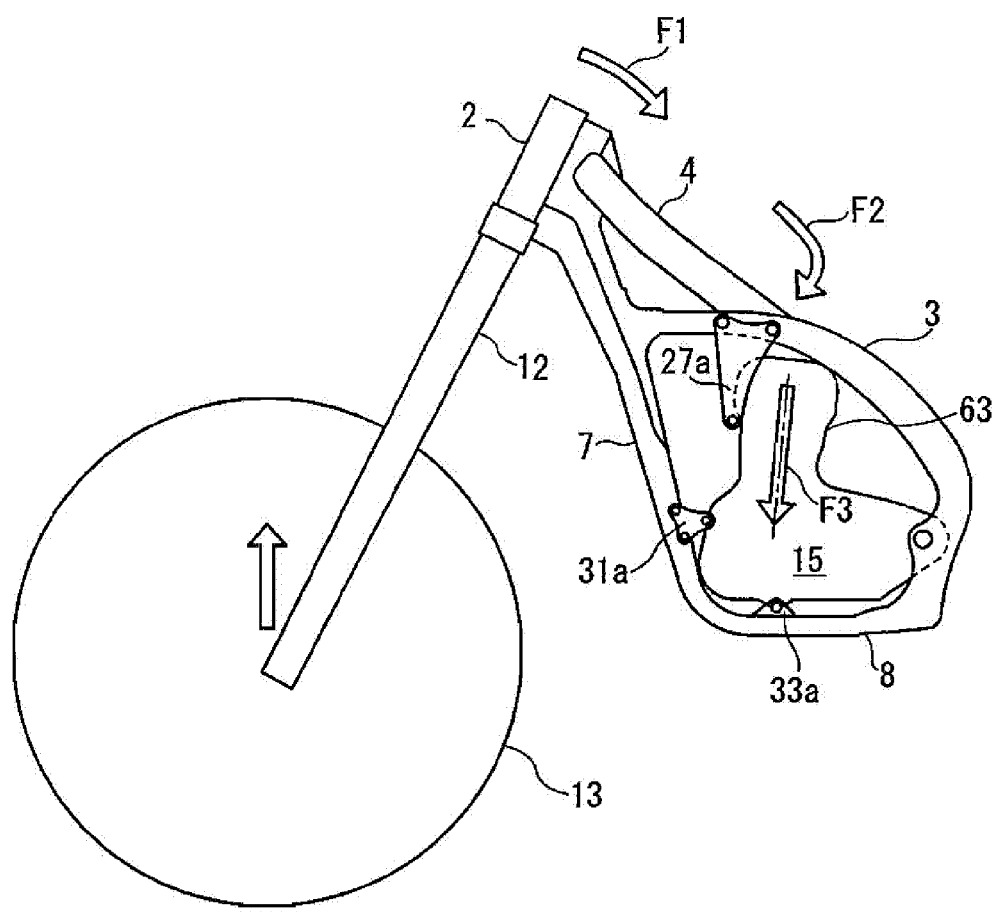
FIG. 22 is a schematic side view for describing stress acting on the motorcycle according to the above-noted embodiment.

For purposes of comparison and contrast, FIG. 22 is a schematic side view for describing stress acting on the motorcycle according to the embodiment as described above. As shown in FIG. 22, downward force F1 to the rear is applied to the head pipe 2, similarly to force F101 of FIG. 21. Accordingly, obliquely downward force F2 to the front is applied to the main frame 3. Therefore, obliquely downward force F3 to the front is applied to the engine 15.

Here, the cylinder 41a is inclined rearward. Thus, an angle formed by a direction of the force F3 and a direction in which the cylinder 41a in the engine 15 extends becomes relatively small. Therefore, a component of the force F3 in the direction that the cylinder 41a extends increases. A component of the force F3 perpendicular to the direction that the cylinder 41a extends decreases. Therefore, it is possible to effectively utilize the engine 15 as a support rigid body. Accordingly, the rigidity of the entire motorcycle 1 can effectively be improved. Also, the rigidity required for the body frame 9 decreases. Therefore, the weight of the body frame 9 can also be reduced. That is, improvement of the rigidity of the motorcycle 1 and a reduction in the weight of the motorcycle 1, which are conflicting goals, can be achieved simultaneously.

In the embodiment described above, the engine 15 is fixed to the body frame 9 at four points: front, rear, left, and right. Therefore, the engine 15 can effectively be utilized as a support rigid body. Accordingly, it is possible to further improve the rigidity of the motorcycle 1.

Further, in the above-described embodiment, as shown in FIG. 12, at least one of at least a portion of the support plate 27a and at least a portion of the support plate 33a is positioned in the area R. Therefore, the engine 15 functions more effectively as a support rigid body against the force F3. Accordingly, the rigidity of the entire motorcycle 1 can be improved further.

More specifically, in the above-described embodiment, both at least a portion of the support plate 27a and at least a portion of the support plate 33a are positioned in the area R. Therefore, the rigidity of the entire motorcycle 1 can further be improved.

The tank rail 4 is provided in the above-described embodiment. The middle of the main frame 3 and the head pipe 2 are connected through the tank rail 4. Therefore, the rigidity of the body frame 9 is further improved.

Moreover, as shown in FIG. 22, when the tank rail 4 is provided, force F2 is applied to the head pipe 2. Therefore, force tends to be applied with intensity on the connection 3n (see FIG. 12) of the main frame 3 to the tank rail 4. In the above-described embodiment, the engine 15 is attached to the connection 3n. Therefore, it is possible to effectively reinforce the connection 3n with the engine 15 acting as a support rigid body. Accordingly, it is possible to further improve the rigidity of the body frame 9.

The center of gravity of the engine 15 is shifted to the rear with the rearward inclination of the cylinder 41a. Consequently, load distribution on the front wheel 13 decreases. Therefore, it is possible to further reduce stress applied on the body frame 9 via the front wheel 13. This is especially effective for an off-road vehicle and an ATV that occasionally run on an irregular terrain.

While the load distribution on the front wheel 13 decreases, that on the rear wheel 21 increases. However, the rear wheel 21 is supported by the rear arm 20. The rear arm 20 is fixed to the main frame 3 in such a way that it is swingable about the pivot shaft 19. Therefore, upward stress applied to the rear wheel 21 is not directly applied to the body frame 9. The upward stress applied to the rear wheel 21 is relaxed by the rear suspension 23, and then is applied to the body frame 9. Therefore, an increase in the load distribution on the rear wheel 21 has little influence on the body frame 9 when compared to an increase in the load distribution on the front wheel 13.

As shown in FIGS. 12 and 18, the engine 15 is fixed to the main frame 3 with the cylinder head 42 in the above-described embodiment. Therefore, the size of the support plate 27a, which fixes the cylinder head 42 to the main frame 3, can be made relatively small.

By contrast, another possibility would be to fix the engine 15 to the main frame 3 with the cylinder body 41. However, in this case, the support plate 27a would be enlarged; therefore, the weight of the motorcycle 1 would tend to increase.

Further, there is a possibility that the cylinder 41a could deform when a large force is applied to the cylinder body 41. Therefore, it would be necessary to improve the rigidity of the cylinder body 41 to prevent deformation of the cylinder 41a if the engine 15 were fixed to the main frame 3 with the cylinder body 41. In addition, the cylinder body tends to reach a relatively high temperature. This causes relatively large thermal expansion of the cylinder body 41. Therefore, if the engine 15 were to be fixed to the main frame 3 with the cylinder body 41, thermal expansion and thermal contraction of the cylinder body 41 would need to be considered.

In contrast, the cylinder head 42 does not reach a temperature as high as the cylinder body 41 does. Therefore, it is not necessary to give careful consideration to influences of the thermal expansion and the thermal contraction when attaching the engine 15 with the cylinder head 42 as in the above-described embodiment. Also, the cylinder head 42 has greater tolerance for deformation than the cylinder body 41. Therefore, when the engine 15 is attached through the cylinder head 42, the weight increase of the motorcycle 1 can be prevented without reinforcement of the cylinder head 42 to a greater degree.

As shown in FIG. 12, the engine 15 is fixed to the main frame 3 with the front portion of the cylinder member 63 in the above-described embodiment. Therefore, it is easy to fix the engine 15 at the connection 3n.

The front portion and the rear portion of the cylinder member 63 are more rigid than the central portion of the cylinder member 63. Therefore, it is possible to more tightly fix the engine 15. In addition, deformation of the engine 15 can be prevented.

With regard to preventing the deformation of the engine 15, it is preferable that the attachment 42a be provided in front of the cam chain chamber 64 as shown in FIG. 17. The rigidity of a portion where the cam chain chamber 64 is provided is relatively low. Therefore, it is preferable that the attachments 42a be provided in a portion in front of the cam chain chamber 64 whose rigidity is relatively high. More specifically, at least a portion of the attachment 42a is preferably positioned in front of the cam chain chamber 64.

If, for instance, the support plate 27a were instead attached to the rear of the cylinder body 41, there would occur a problem of positional interference between the exhaust pipe 56 and the attachment 42a.

By contrast, the support plate 27a is attached to the front portion of the cylinder body 41 in the above-described embodiment. Also, as shown in FIGS. 18 and 19, the throttle body 61, which constitutes a part of the intake pipe, is attached to the engine 15 so as to extend upward to the front. Therefore, positional interference between the throttle body 61 and the attachment 42a is less likely to occur. That is, the mounting position of the attachment 42a can be secured easily if the support plate 27a is attached to the front portion of the cylinder body 41.

In the above-described embodiment, the main frame 3 and the tank rail 4 are provided. The main frame 3 is directly connected to the head pipe 2. The main frame 3 supports the rear arm 20 to which the rear wheel 21 is attached. The rear end of the tank rail 4 is connected to the main frame 3. Therefore, it is possible to connect the main frame 3, which supports the rear arm 20 to which the rear wheel 21 is attached, to the head pipe 2. In addition, the connection between the head pipe 2 and the main frame 3 can be reinforced. Therefore, it is possible to reinforce the connection between the main frame 3 for supporting the rear arm 20 and the head pipe 2 and to suppress an increase in the number of components of the body frame 9.

In the above-described embodiment, the head pipe 2 is formed to extend rearward. The head pipe 2 is formed to include the weld parts 2f, 2g to which the main frame 3 is connected. Therefore, it is possible to easily and directly connect the main frame 3 to the weld parts 2f, 2g of the head pipe 2.

Also, in the above-described embodiment, the bosses 3g for supporting the engine 15 are integrally formed with the main frame 3. Therefore, as compared to the case where the bosses 3g for supporting the engine 15 are separately formed from the main frame 3, it is possible to prevent an increase in the number of components for supporting the engine 15.

Moreover, in the above-described embodiment, the head pipe 2 is provided with the insertion hole 2a in which the steering shaft 11 is inserted and the recess 2h opening in the direction along the direction A in which the insertion hole 2a extends. Therefore, the head pipe 2 having the recess 2h can be easily formed using dies by semi-solid die casting by setting a direction in which the die is pulled out to the direction that the insertion hole 2a extends.

In the above-described embodiment, the left frame 3a and the right frame 3b of the main frame 3 are arranged to extend rearward while having a predetermined spacing therebetween in a vehicle width direction in a plan view. In addition, the left frame 3a and the right frame 3b are arranged to assume a U-shape in such a way that they approach each other toward the body section 2c of the head pipe 2. Therefore, it is possible to improve rigidity of the body frame 9 in a planar direction.

Further, in the above-described embodiment, the recess 3e is formed in each of the connections 3c, 3d of the main frame 3. More specifically, the recess 3e is formed inside the portion of each of the connections 3c, 3d, which is fitted to the tank rail 4. Therefore, it is possible to reduce the weight of the main frame 3.

Still further, in the above-described embodiment, the main frame 3 and the head pipe 2 are formed by semi-solid die casting. Therefore, it is possible to reduce sizes and weights of the main frame 3 and the head pipe 2 in comparison with a case where the main frame 3 and the head pipe 2 are formed by forging or conventional die casting.

Moreover, parts made by forging are less flexible and less accurate in shape than those made by semi-solid die casting. Therefore, when the main frame 3 and the head pipe 2 are formed by forging, it is difficult to form the main frame 3 and the head pipe 2 in a shape of a recess (U-shape) or in a shape with which predetermined strength can be secured. It is necessary to thicken the main frame 3 and the head pipe 2 if they are made by forging. As a result, the main frame 3 and the head pipe 2 tend to be enlarged, and thus the weights of the main frame 3 and the head pipe 2 tend to increase.

In still further contrast to the above-described embodiment of the invention, if the main frame 3 and the head pipe 2 are formed by common die casting, they are weaker than those formed by semi-solid die casting. Consequently, it is necessary to thicken the main frame 3 and the head pipe 2 in order to secure the predetermined strength thereof. Therefore, there is a tendency that the size and weight of the head pipe 2 increases.

Modifications

Figure 23:
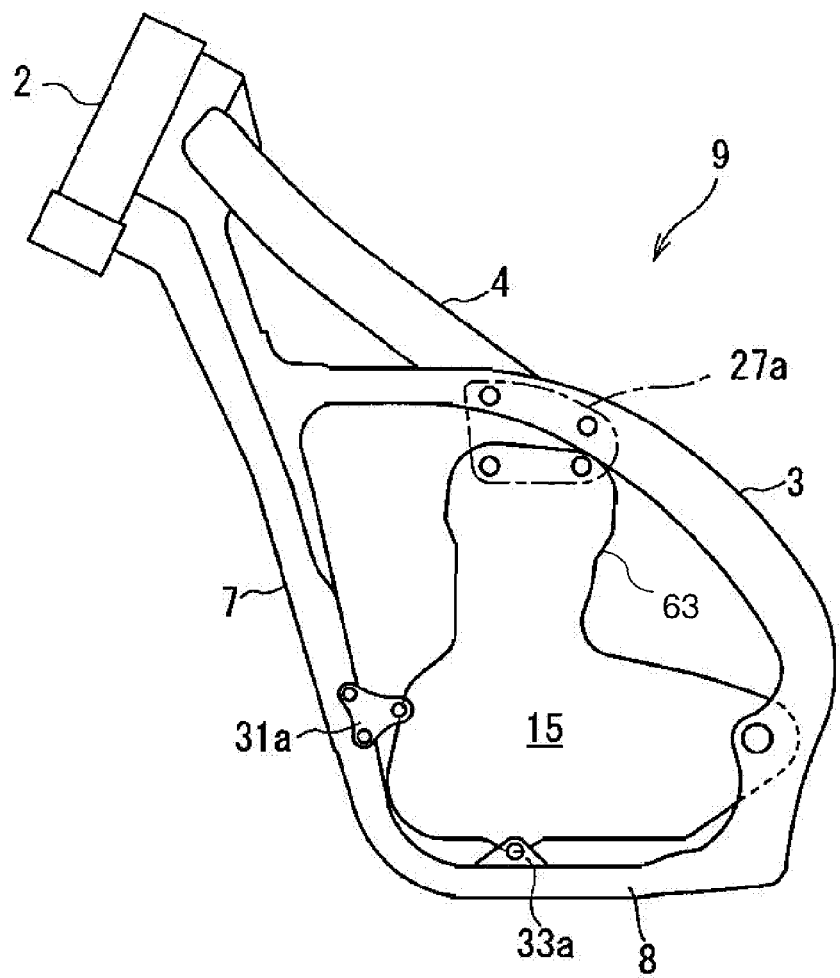
FIG. 23 is a side view showing main parts of a motorcycle according to a first modification.
Figure 24:
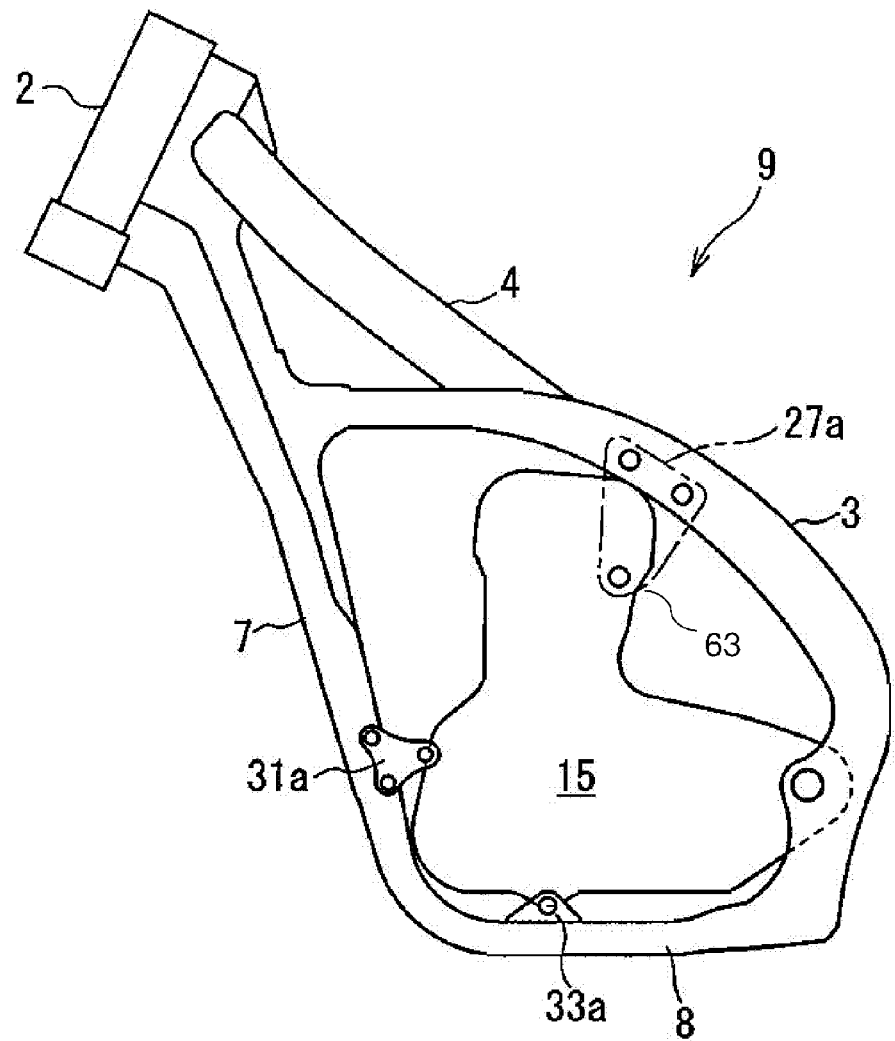
FIG. 24 is a side view showing main parts of a motorcycle according to a second modification.

In the above, a case wherein the engine 15 is fixed to the main frame 3 with the front portion of the cylinder member 63 is described as an example. The present invention, however, is not limited to this structure. For example, in a first modification as shown in FIG. 23, the engine 15 may be fixed to the main frame 3 with the middle portion of the cylinder member 63. In a second modification as shown in FIG. 24, the engine 15 may also be fixed to the main frame 3 with the rear portion of the cylinder member 63. In the foregoing cases, the engine 15 can also be used effectively as a support rigid body. Therefore, the rigidity of the motorcycle can be improved as a whole. In addition, the rigidity required for the body frame 9 decreases. Therefore, the weight of the body frame 9 and hence that of the motorcycle 1 can be reduced.

In the above, the body frame 9 is described as a so-called semi-double cradle type frame. However, the present invention is not limited to this frame type. In the present invention, the body frame may be any body frame that is provided with a portion formed in a loop shape in a side view. The body frame may be a so-called double cradle type, for example. The body frame may also be either a so-called backbone type frame or a truss structure type frame with an added frame to form a loop-shaped frame section.

In the above, an example in which the engine 15 is fixed to the body frame 9 via the support frame is described. However, the invention is not limited to this structure. The engine 15 may be directly fixed to the body frame 9.

Now, it should be understood that the embodiments disclosed herein are given as mere illustrations in all respects, but not given to impose any limitation. The scope of the invention is not defined by the descriptions of the above embodiments, but defined by the scope of the claims, and includes all modifications that fall within the meaning and scope equivalent to the scope of the claims.

For instance, in the above, an example in which the main frame is directly connected to the head pipe is described. However, the invention is not limited thereto. The weld part, to act as a frame fixing part, may be separately formed from the head pipe, and the main frame may be connected to the head pipe via the weld part.

Moreover, in the above, an example in which the head pipe and the main frame are formed by semi-solid die casting is described; however, the invention is not limited to this configuration. The head pipe and the main frame may be formed by a method other than semi-solid die casting. For example, the head pipe and the main frame may be formed by forging or common die casting.

Further, in the above, an example in which the rear suspension bracket is composed of the cross pipe formed by extrusion, and attachments are welded to the cross pipe, has been described. However, the invention is not limited thereto. The rear suspension bracket may be formed by semi-solid die casting. This allows simultaneous forming of the cross pipe and the attachments.

Still further, in the above, an example in which the head pipe and the main frame are formed to have a U-shape in cross section has been described; however, the invention is not limited thereto. The head pipe and the main frame may be formed to not have a U-shaped cross section.

Additionally, in the above, an example in which the fuel tank is supported by the tank rail as a second frame connected to the head pipe and the main frame has been described. However, the invention is not limited thereto. The fuel tank may be supported by the main frame as a first frame.

Figure 25:
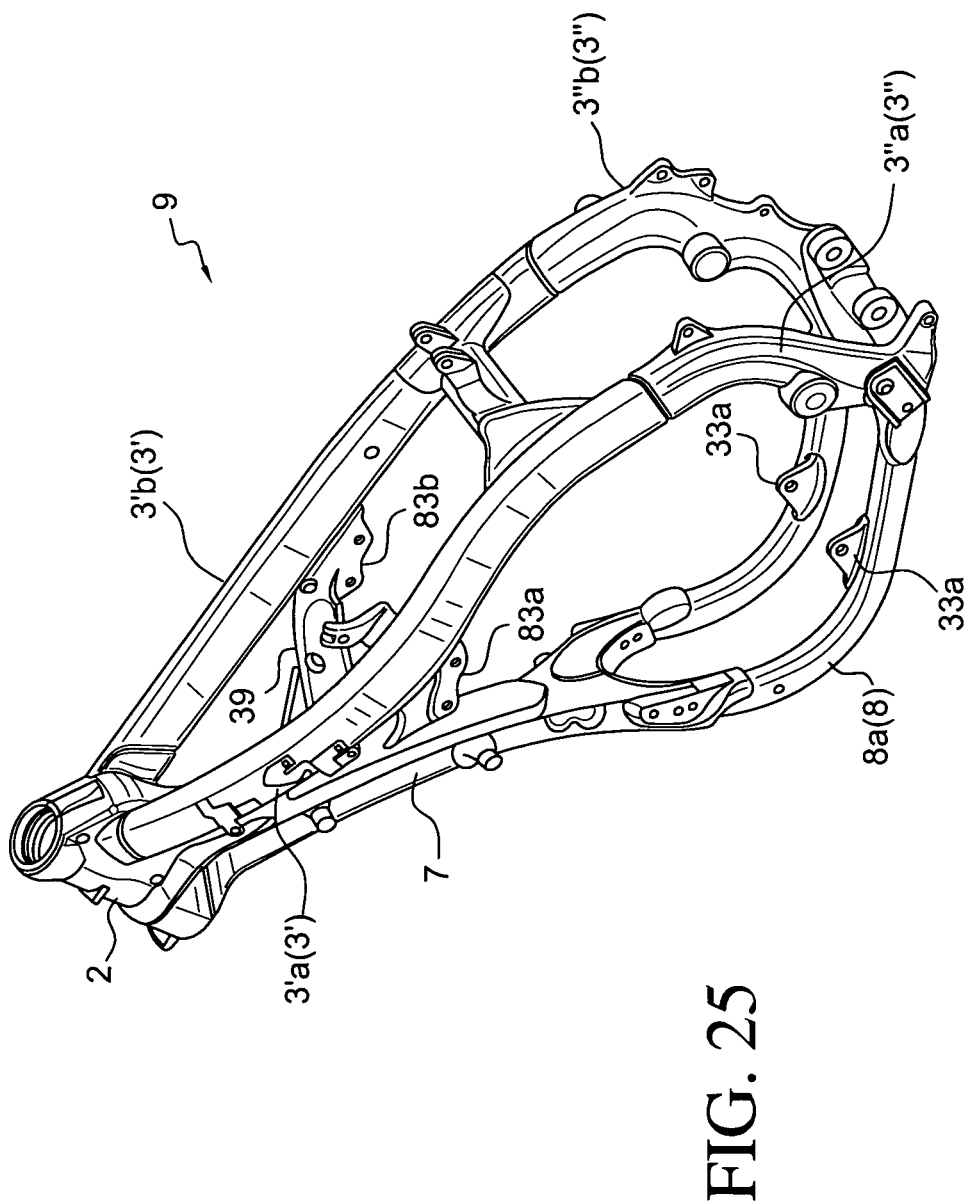
FIG. 25 is a perspective view showing a body frame of a motorcycle according to an alternative embodiment of the invention.
Figure 26:
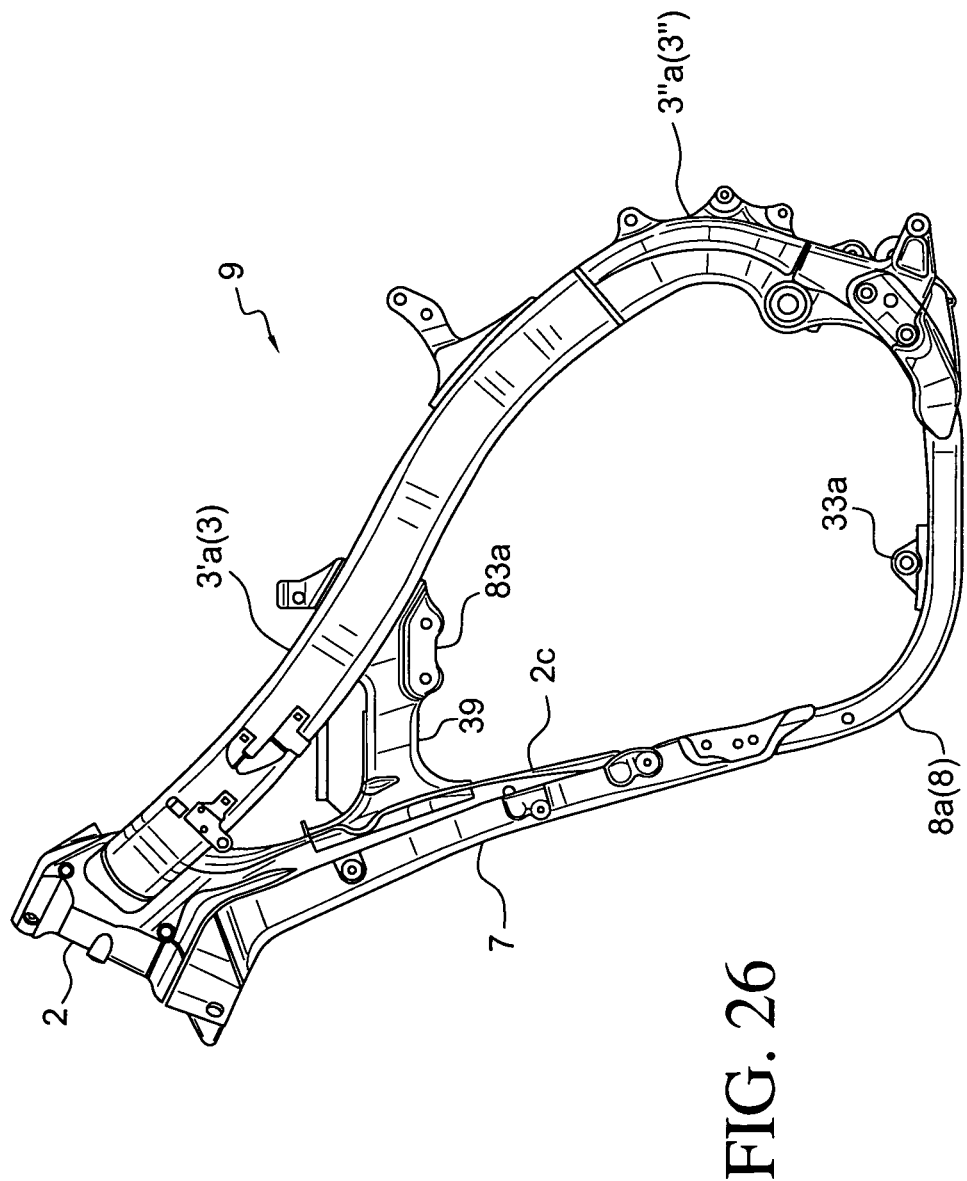
FIG. 26 is a side view showing the body frame according to the alternative embodiment.

FIGS. 25 and 26 illustrate an alternative embodiment of the invention. Referring to FIGS. 25 and 26, the body frame 9 can include a main frame 3' which differs from the main frame 3 described above. More specifically, the main frame 3' can be formed from a left unitary (e.g., formed as a single, integral unit or part) branch or member 3'a and a right unitary branch or member 3'b. Each of the left unitary member 3'a and right unitary member 3'b can be connected at a front end thereof to the head pipe 2, and extend from the head pipe 2 downward and to the rear. The foregoing is in contrast to the previously-described embodiment, in which the main frame 3 connects to the left and right tank rails 4a and 4b, and the tank rails 4a, 4b connect to the head pipe 2.

As shown in FIG. 25, the left and right unitary members 3'a and 3'b can curve outward from the head pipe 2 in a vehicle width direction, as they extend rearward from the head pipe 2. As further shown in FIG. 25, the left and right unitary members 3'a and 3'b can curve inward again as they approach respective lower portions 3"a and 3"b thereof. As shown in FIG. 26, the body section 2c of the head pipe 2 may not surround an uppermost part of the down frame 7. Moreover, as shown in FIG. 26 the body section 2c of the head pipe 2 may not surround any part of the down frame 7.

As shown in FIGS. 25 and 26, the main frame 3' can be connected at an intermediate portion thereof to a linking frame 39. The linking frame 39 can be formed to have approximately a U-shape. A substantially central portion of the linking frame 39 can be connected to the body section 2c of the head pipe 2, at a position below the head pipe 2. Left and right arms of the linking frame 39 can be respectively connected to the left unitary member 3'a and the right unitary member 3'b of the main frame 3'. In a side view as shown in FIG. 26, the body frame 9 formed by the main frame 3' (and the lower portion 3" thereof), the down frame 7, the lower frame 8 and the linking frame 39 is loop-shaped.

Left and right support plates 83a and 83b, respectively, can be formed on, or connected or fixed to, respective left and right arms of the linking frame 39. For example, the left and right support plates 83a and 83b, respectively, can be formed on, or connected or fixed to, ends of the respective left and right arms of the linking frame 39. The engine 15 can be fixed to the body frame 9 by way of the left and right support plates 83a and 83b, and by way of the support plates 33a and 33b.

The main frame 3' can be formed, for example, using any of the techniques described previously, including semi-solid die casting, forging or conventional die casting. Advantages of the main frame 3' include, for example, ease of manufacture, since the left and right unitary members 3'a and 3'b can each be formed as a single, integral unit and fixed to the head pipe 2, avoiding an operation of forming and fixing a tank rail 4 to the head pipe 2 and the main frame 3, as with the first-described embodiment.

As noted previously, it will be understood that the above description of the preferred embodiments of the present invention are susceptible to various modifications, changes and adaptations, and the same are intended to be comprehended within the meaning and range of equivalents of the appended claims. Moreover, it will be apparent to one skilled in the art that the manner of making and using the claimed invention has been adequately disclosed in the above-written description of the preferred embodiments taken together with the drawings.

Further, if used and unless otherwise stated, the terms "upper," "lower," "front," "back," "over," "under," "forward," "rear" and similar such terms are not to be construed as limiting the invention to a particular orientation. Instead, these terms are used only on a relative basis.

Moreover, any term of degree used herein, such as "substantially," and "approximately," means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

What is claimed is:

1. A vehicle a rider straddles comprising:
    a body frame having a head pipe, a main frame extending downward to a rear of the vehicle from the head pipe, a down frame extending downward to the rear from the head pipe in a position below the main frame, and a lower frame connecting an end of the down frame with an end of the main frame;
    a steering shaft rotatably inserted in the head pipe;
    a front fork attached to the steering shaft;
    a front wheel rotatably attached to the front fork;
    an engine having a crankshaft, a crankcase housing the crankshaft, a piston, and a cylinder member attached to the crankcase and having formed therein a cylinder with an axis extending upward obliquely to the rear, the cylinder having an innermost radius so as to form an aperture in the cylinder to house the piston, the axis of the cylinder being located in front of a straight line that intersects an axis of the crankshaft and is parallel to the axis of the cylinder;
    a first support plate for fixing the crankcase and the lower frame to each other; and
    a second support plate for fixing the cylinder member and the main frame to each other,
    wherein both of at least a portion of the first support plate and at least a portion of the second support plate are located in an area corresponding to an extension of the cylinder in a side view, outermost edges of the extension each being both
        disposed a distance, that is equal to said innermost radius, away from said axis of the cylinder, and
        parallel to said axis of the cylinder.

2. The vehicle according to claim 1, the cylinder member including:
    a cylinder body in which the cylinder is formed, and
    a cylinder head mounted on top of the cylinder body,
    wherein the engine is fixed to the main frame with the cylinder head via the second support plate.

3. The vehicle according to claim 1, further comprising:
an attachment, at least a portion of which is located in front of the cylinder, formed in the cylinder member,
wherein the second support plate fixes the attachment and the main frame to each other so as to fix the cylinder member and the main frame to each other.

4. The vehicle according to claim 3, wherein
a cam chain chamber disposed laterally in a vehicle width direction with respect to the cylinder is formed in the cylinder member, and
at least a portion of the attachment is located in front of the cam chain chamber.

5. The vehicle according to claim 1, wherein the body frame has another frame disposed above the main frame and connected to the head pipe and a middle portion of the main frame, and the cylinder member is fixed to a connection of the main frame with the another frame.

6. The vehicle according to claim 1, wherein the engine further has an intake pipe attached to a front side of the cylinder member and extending obliquely upward from the cylinder member, and the cylinder member has an attachment formed lower than the intake pipe,
the second support plate fixing the attachment and the main frame to each other so as to fix the cylinder member and the main frame to each other.

7. The vehicle according to claim 1, further comprising:
a rear arm swingably connected to the main frame; and
a rear wheel rotatably attached to the rear arm.

8. The vehicle according to claim 1, wherein
the head pipe has a cylindrical portion and a body section,
the main frame includes left and right unitary members, the left and right unitary members are each a single integral unit, each of the left and right unitary members being connected at a front end thereof to the head pipe and extending downward and to the rear from the head pipe,
the body frame further including a linking frame connecting the left and right unitary members to the body section of the head pipe at a position below the cylindrical portion of the head pipe,
the second support plate includes at least one support plate which is at least one of formed on or connected to the linking frame, for connecting the engine to the body frame,
the body section of the head pipe does not surround an uppermost part of the down frame.

9. The vehicle according to claim 8, wherein the left and right unitary members each curves outward from the head pipe in a vehicle width direction.

10. The vehicle according to claim 8, wherein the linking frame is formed in approximately a U-shape.

11. The vehicle according to claim 10, wherein a left arm of the linking frame is connected to the left unitary member and a right arm of the linking frame is connected to the right unitary member.

12. The vehicle according to claim 10, wherein a substantially central portion of the linking frame is connected to the body section of the head pipe.

13. The vehicle according to claim 8, wherein the main frame, the down frame, the lower frame and the linking frame form a loop shape in a side view.

14. The vehicle according to claim 8, wherein the linking frame includes a portion in contact with the body section of the head pipe.

15. The vehicle according to claim 8, wherein the body section of the head pipe does not surround any part of the down frame.

16. The vehicle according to claim 8, wherein a connection of the left and right unitary members to the head pipe is further forward than a connection of the linking frame to the body section.

17. The vehicle according to claim 1, wherein every cylinder of the engine extends upward obliquely to the rear.

18. The vehicle according to claim 1, wherein both a portion of the first support plate, and a portion, which is directly connected to the main frame, of the second support plate are located in the area corresponding to the extension of the cylinder in a side view.

* * * * *